US012580093B2

(12) United States Patent
Sakai et al.

(10) Patent No.: US 12,580,093 B2
(45) Date of Patent: Mar. 17, 2026

(54) QUANTUM SIMULATOR AND QUANTUM SIMULATION METHOD

(71) Applicants: HAMAMATSU PHOTONICS K.K., Hamamatsu (JP); INTER-UNIVERSITY RESEARCH INSTITUTE CORPORATION NATIONAL INSTITUTES OF NATURAL SCIENCES, Mitaka (JP)

(72) Inventors: Hiroto Sakai, Hamamatsu (JP); Kenji Ohmori, Okazaki (JP); Taro Ando, Hamamatsu (JP); Sylvain De Léséleuc, Okazaki (JP); Takafumi Tomita, Okazaki (JP); Seiji Sugawa, Okazaki (JP); Yoshiyuki Ohtake, Hamamatsu (JP); Haruyoshi Toyoda, Hamamatsu (JP)

(73) Assignees: HAMAMATSU PHOTONICS K.K., Hamamatsu (JP); INTER-UNIVERSITY RESEARCH INSTITUTE CORPORATION NATIONAL INSTITUTES OF NATURAL SCIENCES, Mitaka (JP)

( * ) Notice: Subject to any disclaimer, the term of this patent is extended or adjusted under 35 U.S.C. 154(b) by 452 days.

(21) Appl. No.: 18/019,874

(22) PCT Filed: Aug. 24, 2021

(86) PCT No.: PCT/JP2021/031032

§ 371 (c)(1),
(2) Date: Feb. 6, 2023

(87) PCT Pub. No.: WO2022/045147

PCT Pub. Date: Mar. 3, 2022

(65) Prior Publication Data

US 2023/0317309 A1 Oct. 5, 2023

(30) Foreign Application Priority Data

Aug. 31, 2020 (JP) ................................ 2020-145812

(51) Int. Cl.
*G21K 1/00* (2006.01)

(52) U.S. Cl.
CPC .................................. *G21K 1/006* (2013.01)

(58) Field of Classification Search
CPC ................................ G21K 1/006; G02F 1/01
See application file for complete search history.

(56) References Cited

U.S. PATENT DOCUMENTS 7,351,953 B2 * 4/2008 Grier .................. G03H 1/0005
250/251
11,120,360 B2 * 9/2021 Kim ........................ G03H 1/30
(Continued)

FOREIGN PATENT DOCUMENTS

JP 2018-180179 A 11/2018

OTHER PUBLICATIONS

Haase, T. A. et al., "A versatile apparatus for two-dimensional atomtronic quantum simulation," Review of Scientific Instruments, vol. 88, 2017, p. 113102-1-p. 113102-6.
(Continued)

*Primary Examiner* — Wyatt A Stoffa
(74) *Attorney, Agent, or Firm* — Faegre Drinker Biddle & Reath LLP

(57) ABSTRACT

A quantum simulator includes a chamber, a light beam generation apparatus, and a photodetector. The light beam generation apparatus includes a light source, an optical mask, a spatial light modulator, and a lens. The optical mask includes an inner region having a rectangular shape with a side parallel to a first direction or a second direction, and an outer region surrounding the inner region. When an xy coordinate system including an x axis parallel to the first
(Continued)

direction and a y axis parallel to the second direction is set on an image plane, the light beam generation apparatus forms and regularly arranges focusing spots such that a minimum value of a difference between x coordinate values and a minimum value of a difference between y coordinate values of center positions of the focusing spots are longer than a non-overlapping distance.

12 Claims, 23 Drawing Sheets

(56) References Cited

U.S. PATENT DOCUMENTS

| | | | | |
|---|---|---|---|---|
| 11,668,961 | B2 * | 6/2023 | Heber | G02F 1/01 359/279 |
| 12,020,828 | B2 * | 6/2024 | Saffman | G04F 5/14 |
| 2009/0073563 | A1 * | 3/2009 | Betzig | G02B 21/0056 359/578 |
| 2012/0081687 | A1 | 4/2012 | Burrow et al. | |
| 2018/0292786 | A1 * | 10/2018 | Sakai | G21K 1/006 |
| 2021/0166147 | A1 * | 6/2021 | Kim | G02F 3/00 |
| 2021/0337171 | A1 * | 10/2021 | Saffman | H04N 9/312 |
| 2022/0206433 | A1 * | 6/2022 | Ahn | H04N 13/254 |
| 2023/0194427 | A1 * | 6/2023 | Alexandros | G02B 21/14 250/459.1 |
| 2023/0282385 | A1 * | 9/2023 | Kim | G21K 1/006 250/251 |
| 2023/0288637 | A1 * | 9/2023 | Hermans | G06N 10/40 |
| 2023/0326623 | A1 * | 10/2023 | Keesling Contreras | G21K 1/06 378/70 |
| 2024/0127092 | A1 * | 4/2024 | King | G06N 10/60 |
| 2025/0183892 | A1 * | 6/2025 | Sank | G06N 10/40 |

OTHER PUBLICATIONS

Robert-De-Saint-Vincent, M. et al., "Anisotropic 2D diffusive expansion of ultracold atoms in a disordered potential," Physical Review Letters, vol. 104, No. 22, 2010, p. 220602-1-p. 220602-4.

Schonbrun, E. et al., "3D interferometric optical tweezers using a single spatial light modulator," Optics Express, vol. 13, No. 10, 2005, pp. 3777-3786.

Shaw, L. A. et al., "Scanning holographic optical tweezers," Optics Letters, vol. 42, No. 15, 2017, pp. 2862-2865.

International Preliminary Report on Patentability mailed Mar. 9, 2023 for PCT/JP2021/031032.

* cited by examiner

Fig.10

| EXAMPLE | | 1 | 2 | 3 | 4 | 5 |
|---|---|---|---|---|---|---|
| PRIMITIVE LATTICE | | RECTANGULAR | SQUARE ※1 | EQUILATERAL TRIANGULAR | KAGOME | HEXAGONAL |
| ANGLE BETWEEN a AND b | | 90° | | 60° | | |
| a | $\theta = 0$ | (L,0) | | | | |
| | $\theta = \alpha$ | $(L\cos\alpha, L\sin\alpha)$ | | | | |
| b | $\theta = 0$ | $(0, \beta L)$ | | $(L\cos\frac{\pi}{3}, L\sin\frac{\pi}{3})$ | | |
| | $\theta = \alpha$ | $(\beta L\cos(\alpha+\frac{\pi}{2}), \beta L\sin(\alpha+\frac{\pi}{2}))$ | | $(L\cos(\alpha+\frac{\pi}{3}), L\sin(\alpha+\frac{\pi}{3}))$ | | |
| SET OF m AND n ※2 | | P | | | P-Q ※3 | P-R ※4 |

※1 $\beta = 1$

※2 P : $\{(\kappa, \ell) \mid \kappa, \ell \in Z\}$,
Q : $\{(2\kappa+1, 2\ell \mid \kappa, \ell \in Z\}$,
R : $\{(3\kappa+1, 3\ell+2) \mid \kappa, \ell \in Z\} \cup \{(3\kappa+2, 3\ell) \mid \kappa, \ell \in Z\} \cup \{(3\kappa, 3\ell+1) \mid \kappa, \ell \in Z\}$ ※3 P-Q represents set difference obtained by removing Q from P.

※4 P-R represents set difference obtained by removing R from P.

QUANTUM SIMULATOR AND QUANTUM SIMULATION METHOD

TECHNICAL FIELD

The present invention relates to a quantum simulator and a quantum simulation method.

BACKGROUND ART

A behavior of a substance in a micro region of atomic level has been known to obey quantum mechanics. A phenomenon in such a micro region has a length scale which is significantly different from a scale of the real world, and does not usually appear in a form which is directly visible to us. However, due to the development of a science and technology in recent years, an effective technique which uses quantum mechanical effects has begun to be produced. The range of applications of the technique extends widely, such as superconductivity, a communication element, development of a medicine, and a substance with a new function (such as a special electric conductive substance, and a strong magnet), and accordingly, understanding the behavior of quanta is becoming important as a first step of producing a new technique.

In an actual substance, the above-described quantum mechanical effects are generated through interactions between a large number of particles. Even in such a situation, describing a phenomenon by quantum mechanics is supposed to be possible in principle, however, quantum mechanics including a plurality of particles (quantum many-body problem) is extremely complicated, and predicting the behavior theoretically and numerically can be considered impossible in actuality, except for an ideal form which is significantly deviated from a real system.

A quantum simulator gathers attention in recent years as a method for studying the quantum mechanical many-body problem which is complicated as described above. The quantum simulator prepares a model system including physical characteristics of an object under study, and actually drives the model system to observe what phenomenon occurs. For example, when studying a quantum mechanical phenomenon in a crystal, a model system in which appropriate atoms are arranged according to spatial arrangement in accordance with a crystal structure is prepared. In an actual crystal, an interatomic distance is small, and observing the behavior of the atoms is difficult, however, by arranging atoms at intervals of about micrometers, it is possible to prepare a model system of a size in which a quantum phenomenon can be easily controlled and observed.

The quantum simulator controls positions of arranged atoms and applies some stimulus to each of the arranged atoms, so as to be able to detect an influence which appears in an entire system. The quantum simulator uses an optical trap technique in which light is focused to trap atoms at a focusing spot as a means for arranging atoms (see Patent Document 1). Further, the quantum simulator uses a technique of generating a light pattern having a predetermined shape and irradiating arranged atoms as a means for applying a stimulus to the atoms. By repeating a detection process a plurality of times under an identical condition, for example, existence probability of an electron that is important for analysis can be known, and thus, excellent controllability and reproducibility are required for both of the means for arranging atoms and the means for applying a stimulus to the atoms.

CITATION LIST

Patent Literature

Patent Document 1: Japanese Patent Application Laid-Open Publication No. 2018-180179

SUMMARY OF INVENTION

Technical Problem

When a plurality of atoms are regularly arranged by the optical trap technique, a spatial light modulator can be used. By spatially phase-modulating or amplitude-modulating light by the spatial light modulator, a plurality of focusing spots can be formed and regularly arranged one-dimensionally or two-dimensionally on an image plane by modulated light. Further, when the spatial light modulator is used, by adding a modulation pattern for correcting aberration from a light source to the image plane to a modulation pattern for forming the plurality of focusing spots, it is possible to make light intensities of the plurality of focusing spots uniform, reduce distortion in an arrangement of the plurality of focusing spots, and reduce distortion in a shape of each of the plurality of focusing spots.

However, when the light is incident into the spatial light modulator via an optical mask, and the plurality of focusing spots are formed on the image plane by the spatial light modulator, a side lobe which becomes a noise is formed around each focusing spot, and the side lobe may overlap other focusing spots. When the side lobe and the focusing spot overlap each other as described above, regular arrangement of the plurality of atoms is affected, and there is a possibility that accuracy of the quantum simulation decreases.

The present invention has been made to solve the above problem, and an object thereof is to provide a quantum simulator and a quantum simulation method capable of performing regular arrangement of a plurality of atoms with high accuracy.

Solution to Problem

A quantum simulator according to an embodiment of the present invention includes (1) a chamber having a window; (2) a light beam generation apparatus for causing light to enter the chamber through the window, and forming and regularly arranging a plurality of focusing spots for trapping atoms one-dimensionally or two-dimensionally on an image plane in the chamber; and (3) a detector for detecting a state of the atoms trapped in the focusing spots in the chamber. The light beam generation apparatus includes an optical mask including an inner region having a rectangular shape with a side parallel to a first direction or a second direction and an outer region surrounding the inner region, and having a light transmittance or a phase modulation amount being different between the inner region and the outer region, and a spatial light modulator for spatially phase-modulating or amplitude-modulating light input to a modulation plane on which a plurality of pixels are arranged two-dimensionally and outputting modulated light, and causes the modulated light modulated by the spatial light modulator via the optical mask to enter the chamber through the window, and when an xy coordinate system including an x axis parallel to the first direction and a y axis parallel to the second direction is set on the image plane, the plurality of focusing spots are formed such that a minimum value $\delta x_{min}$ of a difference between x coordinate values and a minimum value $\delta y_{min}$ of a difference between y coordinate values of center positions of the plurality of focusing spots are longer than a non-overlapping distance.

A quantum simulation method according to an embodiment of the present invention includes (1) an optical trapping step of causing light to enter a chamber through a window of the chamber, and forming and regularly arranging a plurality of focusing spots for trapping atoms one-dimensionally or two-dimensionally on an image plane in the chamber; and (2) a detection step of detecting a state of the atoms trapped in the focusing spots in the chamber. In the optical trapping step, an optical mask including an inner region having a rectangular shape with a side parallel to a first direction or a second direction and an outer region surrounding the inner region, and having a light transmittance or a phase modulation amount being different between the inner region and the outer region, and a spatial light modulator for spatially phase-modulating or amplitude-modulating light input to a modulation plane on which a plurality of pixels are arranged two-dimensionally and outputting modulated light are used, and the modulated light modulated by the spatial light modulator via the optical mask is caused to enter the chamber through the window, and when an xy coordinate system including an x axis parallel to the first direction and a y axis parallel to the second direction is set on the image plane, the plurality of focusing spots are formed such that a minimum value $\delta x_{min}$ of a difference between x coordinate values and a minimum value $\delta y_{min}$ of a difference between y coordinate values of center positions of the plurality of focusing spots are longer than a non-overlapping distance.

Advantageous Effects of Invention

According to the embodiments of the present invention, it is possible to perform regular arrangement of a plurality of atoms with high accuracy, and improve accuracy of quantum simulation.

BRIEF DESCRIPTION OF DRAWINGS

FIG. 10 is a table showing a rectangular lattice arrangement, a square lattice arrangement, an equilateral triangular lattice arrangement, a kagome lattice arrangement, and a hexagonal lattice arrangement used in examples.

DESCRIPTION OF EMBODIMENTS

Hereinafter, embodiments for carrying out the present invention will be described in detail with reference to the accompanying drawings. In the description of the drawings, the same elements will be denoted by the same reference signs, and redundant description will be omitted. The present invention is not limited to these examples, and the Claims, their equivalents, and all the changes within the scope are intended as would fall within the scope of the present invention.

First, a quantum simulator and a quantum simulation method will be described. Subsequently, details of a light beam generation apparatus which forms focusing spots for trapping and regularly arranging atoms in the present embodiment will be described.

Figure 1:
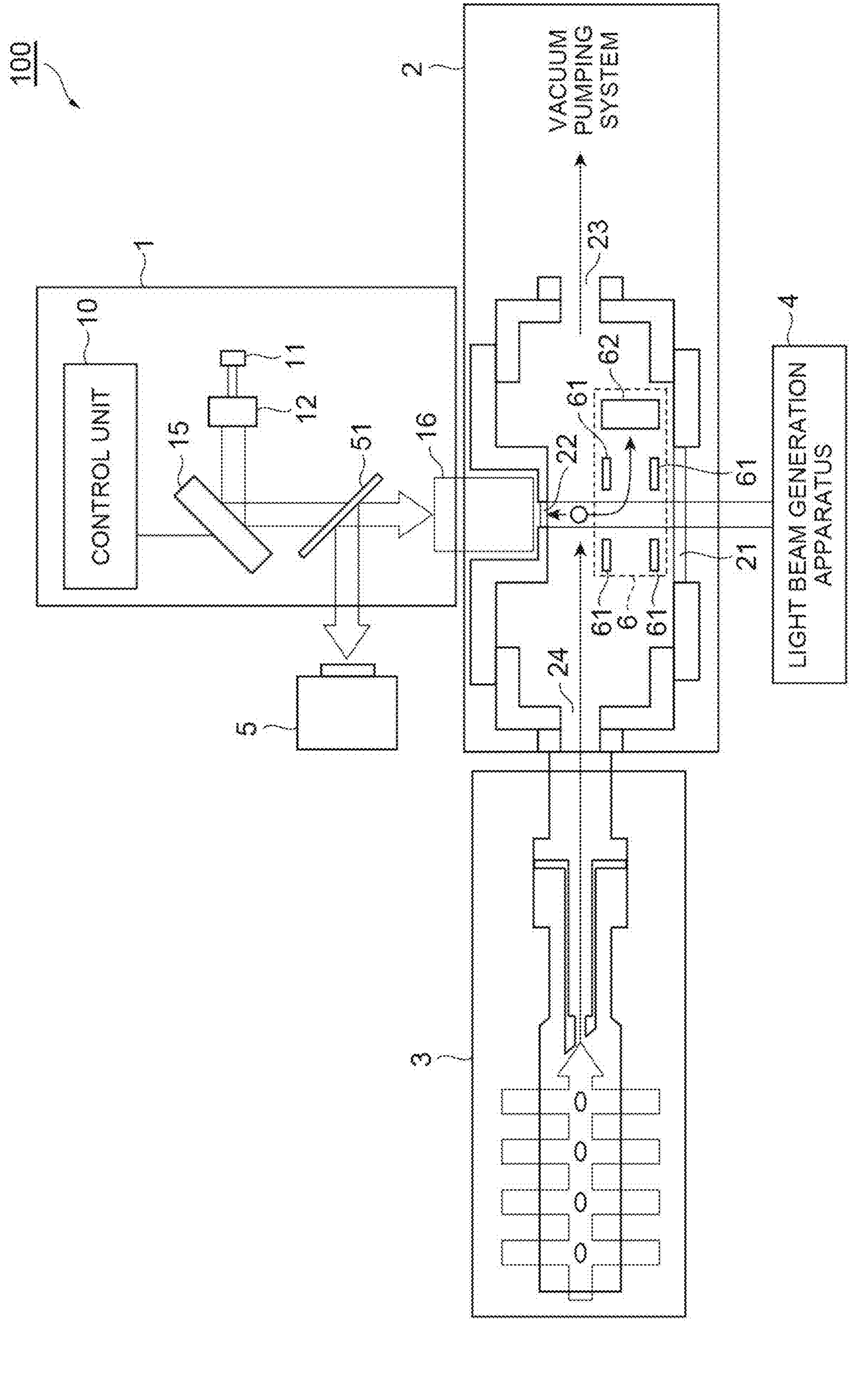
FIG. 1 is a diagram illustrating a configuration of a quantum simulator 100.

FIG. 1 is a diagram illustrating a configuration of a quantum simulator 100. The quantum simulator 100 includes an optical stimulation application apparatus 1, a chamber 2, an atomic gas supply apparatus 3, a light beam generation apparatus 4, a photodetector 5, and an atom number detector 6.

The chamber 2 includes windows (a first window 21 and a second window 22) for transmitting light between the outside and the inside. The first window 21 is optically coupled to the light beam generation apparatus 4. The second window 22 is optically coupled to the optical stimulation application apparatus 1. In addition, the first window and the second window may be configured with a common window. The chamber 2 includes an exhaust opening 23 used for exhausting gas in the inside by a vacuum pumping system, and can maintain the inside in an ultra-high vacuum state by exhaust using a pump and adsorption of gas using a getter. The chamber 2 includes an atomic gas introduction opening 24 for introducing an atomic gas supplied from the atomic gas supply apparatus 3 into the inside. Further, the chamber 2 includes an MOT magnetic circuit for trapping atoms by actions of light and a magnetic field. MOT is an abbreviation of "Magneto-Optical Trap", and is a technique for trapping an atom group by actions of light and a magnetic field.

The atomic gas supply apparatus 3 supplies an atomic gas to the inside of the chamber 2. The atomic gas supply apparatus 3 includes a heater which is arranged in the inside or around a vacuum glass cell and generates atoms in a gas state by heating desired metal atoms or a compound or the like containing desired atoms, and a magnetic circuit including coils or the like which generates a magnetic field by applying an electric current. The atomic gas supply apparatus 3 generates the atomic gas by the heater heating metal atoms, and traps a metal gas by light pressure of laser light with which the vacuum glass cell is irradiated and actions of light and a magnetic field. The atomic gas supply apparatus 3 then transports the trapped atomic gas to a predetermined position by light pressure of another laser light irradiation, and supplies the atomic gas through the atomic gas introduction opening 24 of the chamber 2 into the chamber 2.

The light beam generation apparatus 4 causes light to enter the inside of the chamber 2 through the first window 21, and forms focusing spots for trapping atoms in the inside of the chamber 2. The light beam incident into the inside of the chamber 2 from the light beam generation apparatus 4 through the first window 21 is preferably laser light. Atoms in the inside of the chamber 2 are trapped by light pressure of the laser light and actions of light and a magnetic field. Further, the trapped atoms may be transported to or arranged at a predetermined position by light pressure of another laser light. The atoms may further be excited by still another laser light and a radio wave from a radio wave generation source. The light beam generation apparatus 4 generates the above laser light, and further, generates a radio wave. Formation of a plurality of focusing spots by the light beam generation apparatus 4 will be described in detail later.

The optical stimulation application apparatus 1 causes light to enter the inside of the chamber 2 through the second window 22, and applies an optical stimulus to the atoms trapped in the focusing spot in the inside of the chamber 2. The optical stimulation application apparatus 1 may generate, for example, a pseudo speckle pattern as an optical stimulation pattern as described in Patent Document 1. The optical stimulation application apparatus 1 includes a control unit 10, a light source 11, a beam expander 12, a spatial light modulator 15, and a lens 16.

The light source 11 outputs light. The beam expander 12 is optically coupled to the light source 11, and outputs the light output from the light source 11 after enlarging a beam diameter. The spatial light modulator 15 is of a phase modulation type, and has a settable modulation distribution of a phase. The spatial light modulator 15 is optically coupled to the beam expander 12, inputs the light which is output from the light source 11 and has a beam diameter expanded by the beam expander 12, spatially modulates the input light according to the modulation distribution, and outputs the modulated light.

The lens 16 is optically coupled to the spatial light modulator 15, and is preferably an objective lens having a high NA. The lens 16 inputs the light output from the spatial light modulator 15, and causes the light to enter the inside of the chamber 2 through the second window 22. The lens 16 is a reproducing optical system which reproduces an optical stimulation pattern in the inside of the chamber 2 by the light incident into the inside of the chamber 2. The control unit 10 may set a computer generated hologram obtained based on a two-dimensional pseudo random number pattern (preferably further based on a correlation function) as the modulation distribution of the spatial light modulator 15.

A dichroic mirror 51 is inserted on an optical path between the spatial light modulator 15 and the lens 16. The dichroic mirror 51 transmits the light output from the light source 11, and reflects light such as fluorescence generated by the atoms in the inside of the chamber 2. The photodetector 5 receives light transmitted through the second window 22 and reflected by the dichroic mirror 51 in the light such as fluorescence generated by the atoms in the inside of the chamber 2. The photodetector 5 may detect an intensity of the received light, or may detect a spectrum (for example, a fluorescence spectrum or an absorption spectrum) of the received light. Further, the photodetector 5 may be a CCD camera capable of detecting two-dimensional images.

The atom number detector 6 includes an ionization electrode 61 and an ion detector 62 provided in the inside of the chamber 2. In the atom number detector 6, atoms in a predetermined state is ionized by an electric field formed by the ionization electrode 61 or by applying one or more beams of pulsed light having an appropriate wavelength from the outside, and the ion detector 62 counts the number of ions. Each of the photodetector 5 and the atom number detector 6 can detect the influence of the optical stimulation on the atoms in the inside of the chamber 2 by measuring the number of generated ions while changing the ionization conditions.

The quantum simulation method using the quantum simulator 100 having the above-described configuration includes an atomic gas supply step, an optical trapping step, an optical stimulation application step, and a detection step.

In the atomic gas supply step, an atomic gas is supplied to the inside of the chamber 2 which is in a vacuum state by the atomic gas supply apparatus 3. In the optical trapping step, a light beam for trapping the atoms in the inside of the chamber 2 is generated by the light beam generation apparatus 4, and the light beam is incident into the chamber 2 through the first window 21 to form the focusing spot. The atoms are trapped in the focusing spot, and the atoms are transported or arranged, or the atoms are excited.

In the optical stimulation application step, the optical stimulation application apparatus 1 applies the optical stimulus to the atoms in the inside of the chamber 2 by the light incident from the second window 22 into the chamber 2. In the optical stimulation application step, the spatial light modulator 15 having a settable phase modulation distribution spatially modulates the light, which is output from the light source 11 and has a beam diameter expanded by the beam expander 12, according to the modulation distribution, and outputs the modulated light. Then, the optical stimulation pattern is reproduced in the inside of the chamber 2 by the lens 16 which inputs the light output from the spatial light modulator 15. Further, the control unit 10 may set a computer generated hologram obtained based on a two-dimensional pseudo random number pattern (preferably further based on a correlation function) as the modulation distribution of the spatial light modulator 15.

In the detection step, the influence of the optical stimulation on the atoms in the inside of the chamber 2 is detected by the detector (the photodetector 5 or the atom number detector 6). The influence of the optical stimulation on the atoms can be detected by performing the detection while changing a time difference from the application of the optical stimulation to the detection.

The following three modes can be considered as a measurement means. In a first measurement means, the light beam generation apparatus 4 arranges atoms supplied by the atomic gas supply apparatus 3 to the inside of the chamber 2 regardless of existence or non-existence of regularity, and the photodetector 5 or the atom number detector 6 measures a state of the atoms. In a second measurement means, the light beam generation apparatus 4 arranges atoms supplied by the atomic gas supply apparatus 3 to the inside of the chamber 2 regardless of existence or non-existence of regularity, the optical stimulation application apparatus 1 applies the optical stimulus to the atoms, and the photodetector 5 or the atom number detector 6 measures a state of the atoms after a predetermined period of time elapses. Further, in a third measurement means, the light beam generation apparatus 4 arranges atoms supplied by the atomic gas supply apparatus 3 to the inside of the chamber 2 regardless of existence or non-existence of regularity, the optical stimulation application apparatus 1 applies the optical stimulation pattern so that the atoms are rearranged irregularly, and the photodetector 5 or the atom number detector 6 measures a state of the rearranged atoms.

The following two modes can be considered as a measurement value. A first measurement value is a measurement value of a fluorescence spectrum or an absorption spectrum obtained by the photodetector 5. A second measurement value is a measurement value of the number of ions obtained by the atom number detector 6.

The following four modes can be considered as a measurement object. A first measurement object is an atom group itself supplied by the atomic gas supply apparatus 3. A second measurement object is an ion group of atoms ionized by the ionization electrode 61 provided in the inside of the chamber 2. A third measurement object is a Bose-Einstein Condensate (BEC). A BEC is generated by selectively trapping (evaporation cooling) only atoms having a small momentum when an intensity of laser light for trapping atoms introduced into the inside of the chamber 2 from the light beam generation apparatus 4 is gradually weakened. A fourth measurement object is a Rydberg atom group. A Rydberg atom is an atom in a highly-excited state in which an electron is excited in an orbit of a principal quantum number of 10 or larger, and is generated when laser light having one or more wavelengths appropriately selected in accordance with atomic species or a radio wave having one or more frequencies appropriately selected is applied from the light beam generation apparatus 4 to atoms in the inside of the chamber 2 in multiple steps.

The following two modes can be considered as an optical operation for the measurement object. A first optical operation is an operation of the measurement object based on a lattice pattern of light by a standing wave of light. A second optical operation is an operation of the measurement object based on a light pattern by reproduction of a hologram. These operations are performed by a light beam which is allowed to enter the inside of the chamber 2 from the light beam generation apparatus 4.

The following seven modes can be considered as an arranging means for the measurement object. A first arranging means arranges the measurement object by MOT in the inside of the chamber 2. A second arranging means maintains a state in which the measurement object is arranged by MOT in the inside of the chamber 2, and arranges the measurement object at a predetermined position by light pressure by another laser light irradiation. A third arranging means interrupts MOT after arranging the measurement object by MOT in the inside of the chamber 2, and arranges the measurement object at a predetermined position by light pressure by another laser light irradiation. A fourth arranging means maintains a state in which the measurement object is arranged by MOT in the inside of the chamber 2, and arranges the measurement object at a predetermined position by light pressure by another laser light irradiation applied with the first optical operation. A fifth arranging means interrupts MOT after arranging the measurement object by MOT in the inside of the chamber 2, and arranges the measurement object at a predetermined position by light pressure by another laser light irradiation applied with the first optical operation. A sixth arranging means maintains a state in which the measurement object is arranged by MOT in the inside of the chamber 2, and arranges the measurement object at a predetermined position by light pressure by another laser light irradiation applied with the second optical operation. A seventh arranging means interrupts MOT after arranging the measurement object by MOT in the inside of the chamber 2, and arranges the measurement object at a predetermined position by light pressure by another laser light irradiation applied with the second optical operation.

In the quantum simulator 100 and the quantum simulation method described above, the first to third measurement means, the first and second measurement values, the first to fourth measurement objects, the first and second optical operations, and the first to seventh arranging means described above can be combined in variety of ways, so that a model showing characteristics of a crystal structure can be constructed, and the crystal structure can be studied. That is, in the atomic gas supply step, the atomic gas is supplied from the atomic gas supply apparatus 3 to the inside of the chamber 2, and in the optical trapping step, the light beam is applied from the light beam generation apparatus 4 to the inside of the chamber 2, and any of the first to seventh arranging means arranges the atoms in the inside of the chamber 2. Further, the light beam or the radio wave is applied from the light beam generation apparatus 4 to the inside of the chamber 2, and the arranged atoms are converted to any of the first to fourth measurement objects. After that, in the optical stimulation application step, the optical stimulation application apparatus 1 applies the optical stimulus to the atoms in the inside of the chamber 2, and rearranges or provides fluctuation to the atoms in the inside of the chamber 2. Then, in the detection step, the photodetector 5 or the atom number detector 6 is used, and any of the first and second measurement values is acquired by any of the first to third measurement means. In this manner, an influence of disorder on the measurement object or arrangement of the measurement object can be found.

Figure 2:
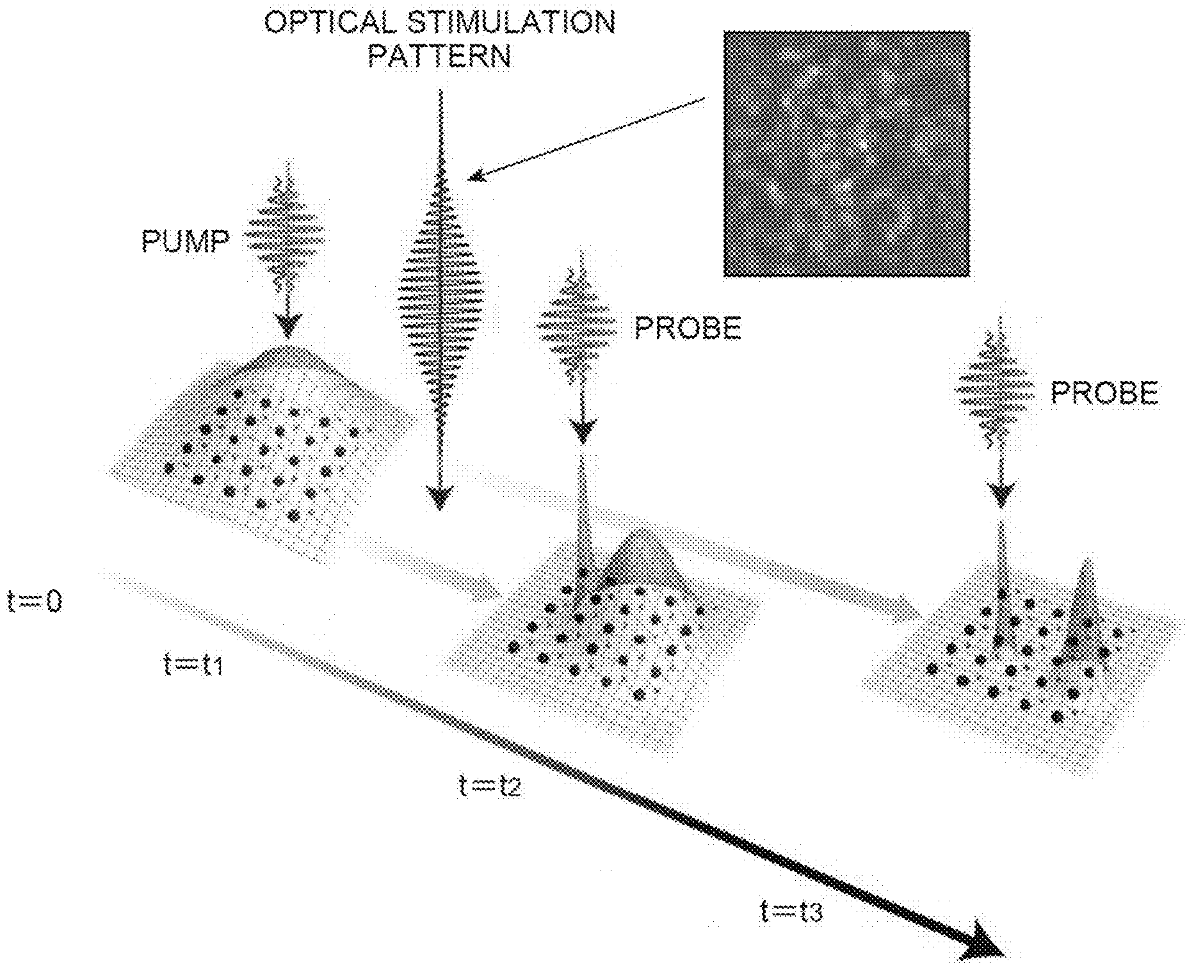
FIG. 2 is a diagram illustrating an example of an operation of the quantum simulator 100 and an example of a quantum simulation method.

A more specific example of the operation of the quantum simulator 100 and an example of the quantum simulation method are as described below. FIG. 2 is a diagram illustrating an example of the operation of the quantum simulator 100 and an example of the quantum simulation method. After the atomic gas is supplied from the atomic gas supply apparatus 3 to the inside of the chamber 2, the light beam is applied from the light beam generation apparatus 4 into the chamber 2, and the atoms in the inside of the chamber 2 are arranged two-dimensionally in five rows and five columns, for example, by the seventh arranging means. In addition, pump light is applied from the light beam generation apparatus 4 into the chamber 2, and the arranged atoms are converted to the fourth measurement object. A time t at which the pump light is applied is set to t=0. At the timing of a time $t=t_1$, the optical stimulation application apparatus 1 generates the optical stimulation pattern in the inside of the chamber 2. At a predetermined time $t=t_2$ after $t=t_1$, the light beam generation apparatus 4 applies probe light to a measurement target point in the inside of the chamber 2, and the second measurement value is acquired by the second measurement means. In addition, in response to the probe light irradiation, ions are generated in accordance with an existence probability of an electron at the measurement target point, and therefore, by repeating the process from the supply of the atomic gas to the acquisition of the second measurement value a plurality of times, the existence probability of the electron can be known. In addition, by accumulating the second measurement values by changing a position of the measurement target point to which the probe light is applied and also changing the probe light irradiation time $t=t_2$ to a variety of times, such as a time $t=t_3$, spatial and temporal changes in an influence of disorder on the measurement object or an electron distribution in the measurement object can be tracked.

In the quantum simulator 100 or the quantum simulation method of the present embodiment, the light beam generation apparatus 4 uses the spatial light modulator for spatially phase-modulating or amplitude-modulating input light and outputting modulated light, and forms and regularly arranges a plurality of focusing spots for trapping atoms one-dimensionally or two-dimensionally on an image plane in the inside of the chamber 2, and it is characterized by an arrangement of the plurality of focusing spots. The above light beam generation apparatus 4 is suitable, for example, for regularly arranging Rydberg atoms.

Figure 3:
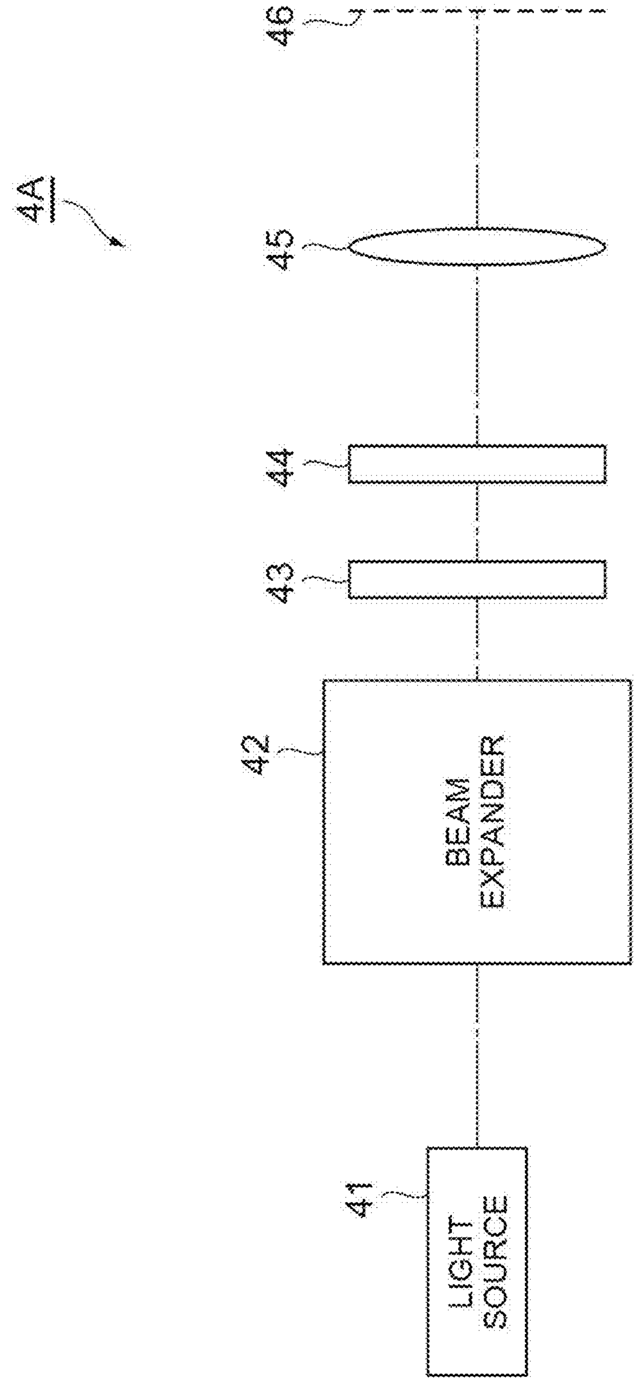
FIG. 3 is a diagram illustrating a configuration example of a light beam generation apparatus 4.

FIG. 3 is a diagram illustrating a configuration example of the light beam generation apparatus 4. The light beam generation apparatus 4A of the present configuration example includes a light source 41, a beam expander 42, an optical mask 43, a spatial light modulator 44, and a lens 45, and forms and regularly arranges the plurality of focusing spots for trapping the atoms on an image plane 46 in the inside of the chamber 2 one-dimensionally or two-dimensionally.

The light source 41 outputs light. The light source 41 is preferably a laser light source. The beam expander 42 is optically coupled to the light source 41, expands a beam diameter of the light output from the light source 41, and outputs the expanded light to the optical mask 43.

The optical mask 43 is optically coupled to the beam expander 42. The optical mask 43 includes an inner region having a rectangular shape (including a square shape) with a side parallel to a first direction or a second direction, and an outer region surrounding the inner region. A transmittance of light or a phase modulation amount is different between the inner region and the outer region. The optical mask 43, for example, in a beam cross-section of the light arrived from the beam expander 42, blocks a peripheral part having a low light intensity in the outer region, and transmits a central part having a high light intensity and high uniformity in the inner region.

In addition, the optical mask 43 may be integrated with the beam expander 42. Further, the optical mask 43 may be integrated with the spatial light modulator 44. In this case, for example, the inner region of the optical mask 43 is a region in which a plurality of pixels of the spatial light modulator exist, and the outer region of the optical mask 43 is a region surrounding the plurality of pixels of the spatial light modulator. Further, for example, the optical mask 43 may be a rectangular type optical fiber integrated with the light source 41.

The spatial light modulator 44 is optically coupled to the optical mask 43. The spatial light modulator 44 inputs the light output from the light source 41, expanded in beam diameter by the beam expander 42, and passed through the optical mask 43, spatially modulates the input light according to a modulation distribution, and outputs the modulated light. The spatial light modulator 44 spatially phase-modulates or amplitude-modulates the light input to a modulation plane on which a plurality of pixels are arranged two-dimensionally, and outputs the modulated light. Each of the plurality of pixels on the modulation plane generally has a rectangular shape (including a square shape) with a side parallel to a third direction or a fourth direction, and the pixels are arranged at regular intervals along the third direction and the fourth direction. The modulation distribution of a phase or an amplitude on the modulation plane is settable.

The lens 45 is optically coupled to the spatial light modulator 44. The lens 45 inputs the light output from the spatial light modulator 44, and forms and regularly arranges the plurality of focusing spots for trapping the atoms one-dimensionally or two-dimensionally on the image plane 46 in the inside of the chamber 2. In the spatial light modulator 44, the modulation distribution for forming and regularly arranging the plurality of focusing spots on the image plane 46 as described above is set.

Figure 4:
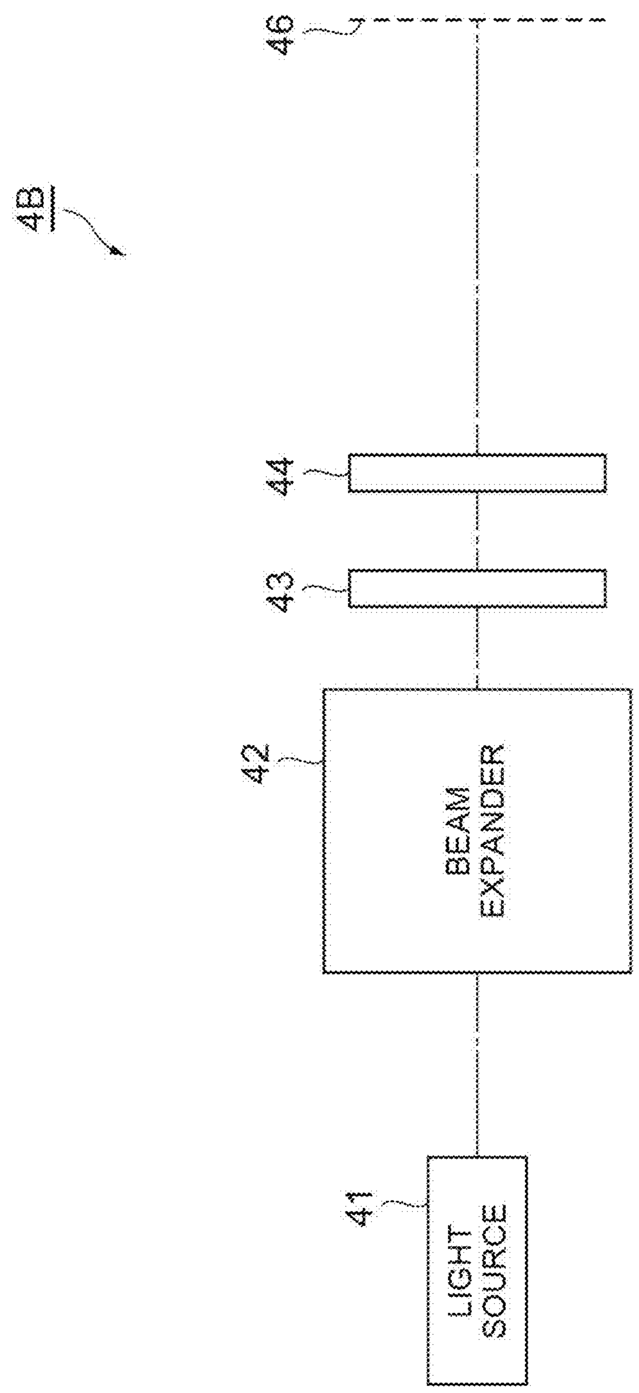
FIG. 4 is a diagram illustrating another configuration example of the light beam generation apparatus 4.

FIG. 4 is a diagram illustrating another configuration example of the light beam generation apparatus 4. Compared with the light beam generation apparatus 4A of the configuration example illustrated in FIG. 3, the light beam generation apparatus 4B of the configuration example illustrated in FIG. 4 is different in that the lens 45 is not provided. The modulation distribution set in the spatial light modulator 44 of the light beam generation apparatus 4B is obtained by adding a modulation distribution (Fresnel lens pattern) for realizing a function of the lens 45 in the light beam generation apparatus 4A to the modulation distribution (modulation distribution for forming and regularly arranging the plurality of focusing spots) set in the spatial light modulator 44 in the light beam generation apparatus 4A.

Figure 5:
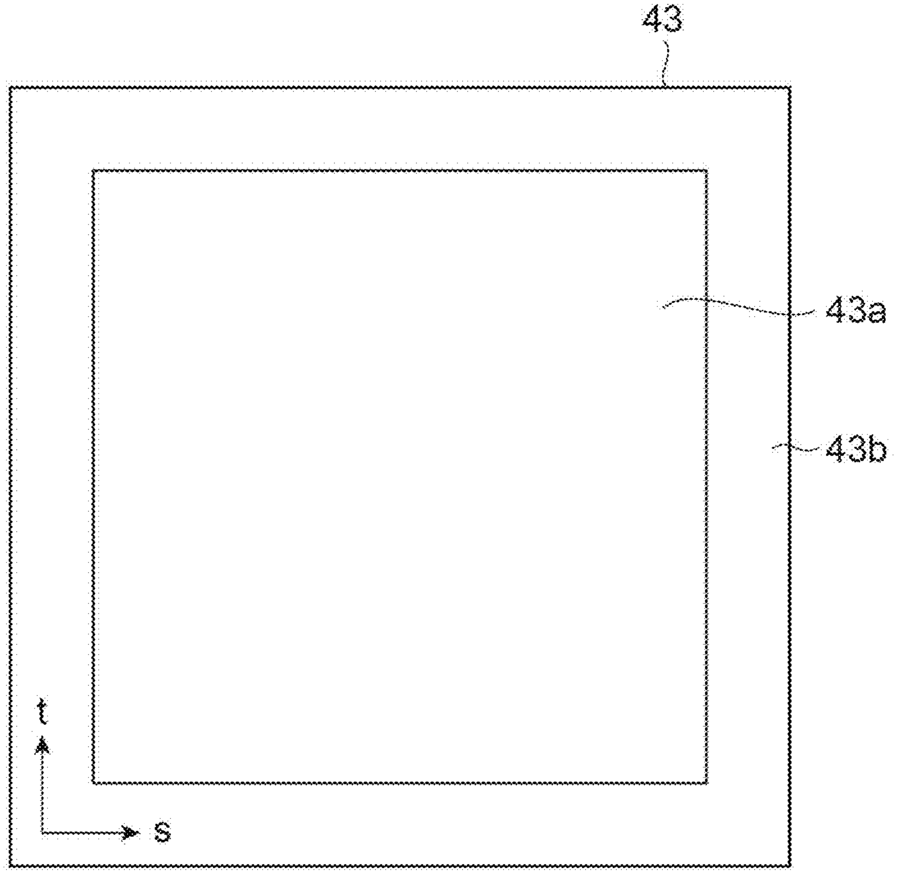
FIG. 5 is a diagram illustrating an optical mask 43 in the light beam generation apparatus 4.

FIG. 5 is a diagram illustrating the optical mask 43 in the light beam generation apparatus 4. The optical mask 43 includes the inner region 43*a* and the outer region 43*b*. The inner region 43*a* has a rectangular shape (including a square shape) having the sides parallel to the first direction (s axis direction in the diagram) or the second direction (t axis direction in the diagram). The inner region 43*a* and the outer region 43*b* have light transmittances or phase modulation amounts different from each other. A change in light transmittance or phase modulation is large at a boundary between the inner region 43*a* and the outer region 43*b*.

Figure 6:
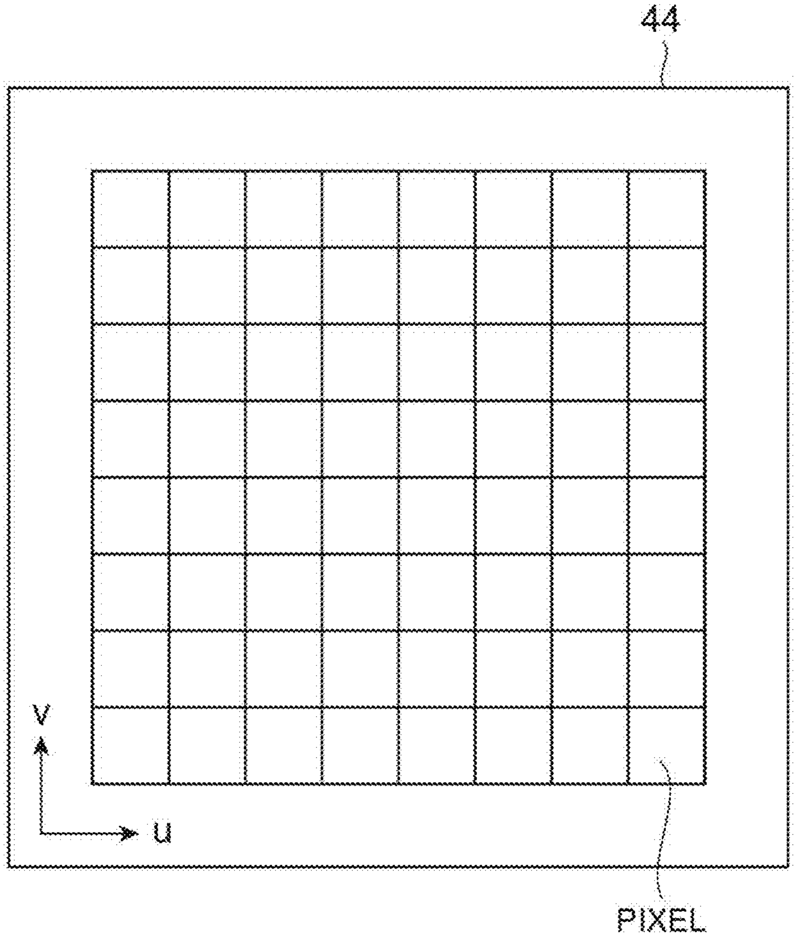
FIG. 6 is a diagram illustrating a two-dimensional arrangement of a plurality of pixels on a modulation plane of a spatial light modulator 44 in the light beam generation apparatus 4.

FIG. 6 is a diagram illustrating a two-dimensional arrangement of the plurality of pixels on the modulation plane of the spatial light modulator 44 in the light beam generation apparatus 4. In this diagram, 8×8 pixels, which are less than actual pixels, are illustrated for ease of illustration. As illustrated in the diagram, each of the plurality of pixels on the modulation plane of the spatial light modulator 44 generally has a substantially rectangular shape (including a square shape) having the sides parallel to the third direction (u axis direction in the diagram) or the fourth direction (v axis direction in the diagram), and the pixels are arranged at regular intervals along the third direction (u axis direction) and the fourth direction (v axis direction).

Figure 7:
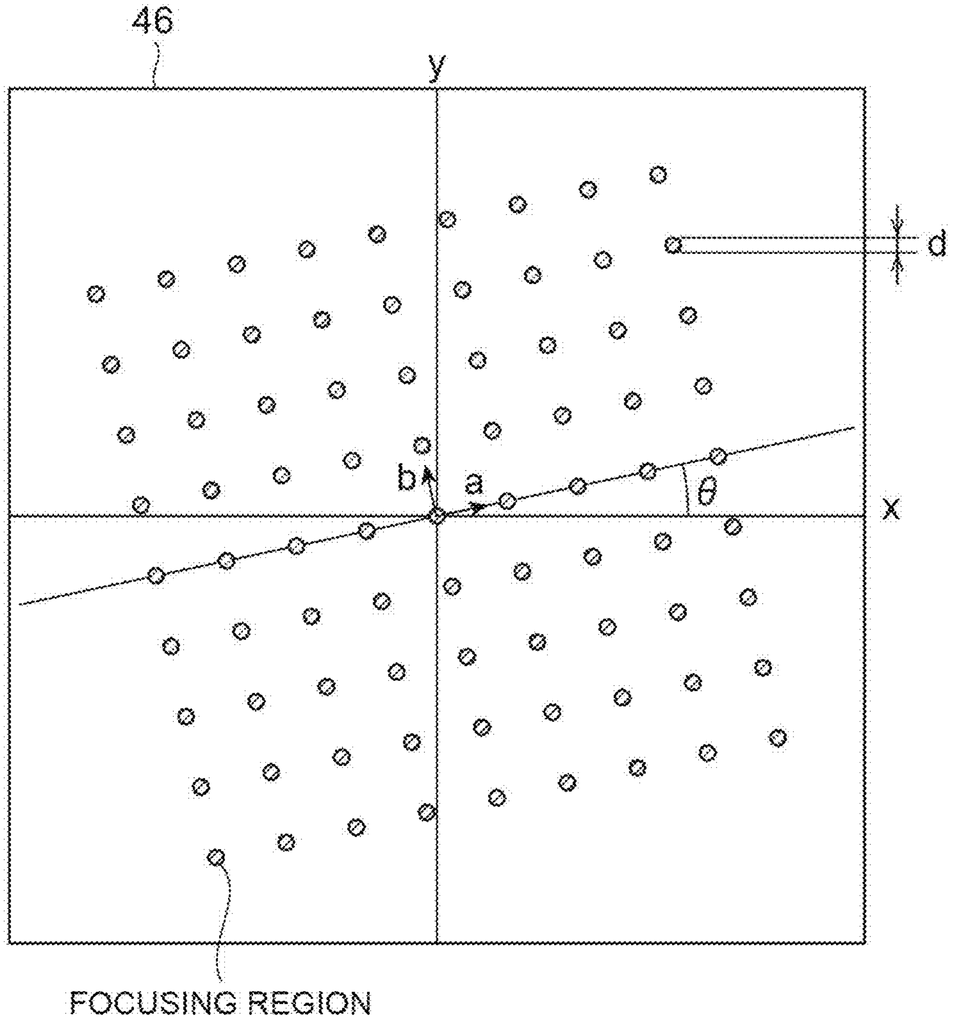
FIG. 7 is a diagram illustrating an arrangement of a plurality of focusing spots on an image plane 46.

FIG. 7 is a diagram illustrating an arrangement of the plurality of focusing spots on the image plane 46. As illustrated in the diagram, the plurality of focusing spots are regularly arranged on the image plane 46. The diagram illustrates an example in which 9×9 focusing spots are arranged in a square lattice shape. In the light intensity distribution of each focusing spot, in general, an intensity gradually decreases with increasing distance from a center position at which the intensity is maximum, and the distribution can be approximated by, for example, a Gaussian distribution. A size d of an atom trapping region by each focusing spot is set based on, for example, a thermal vibration amplitude of the atoms to be trapped when the quantum simulation is performed.

An x axis and a y axis in an xy coordinate system on the image plane 46 illustrated in FIG. 7 are parallel to the projection of the s axis and the t axis on the optical mask 43 illustrated in FIG. 5 onto the image plane 46. The x axis on the image plane 46 is parallel to the s axis on the optical mask 43, and the y axis on the image plane 46 is parallel to the t axis on the optical mask 43. As illustrated in FIG. 7, the regular arrangement of the plurality of focusing spots on the image plane 46 has primitive axes represented by a primitive vector a and a primitive vector b. A direction of each of the primitive vectors a and b is not parallel to the x axis direction and the y axis direction. The directions of the primitive vectors a and b may be orthogonal to each other, or may not be orthogonal to each other. Lengths of the primitive vectors a and b may be equal to each other, or may be different from each other. An angle formed by one primitive vector a with respect to the x axis direction is defined as 0.

A center position of each of the plurality of focusing spots on the image plane 46 can be represented by vectors in a form of ma+nb+c using the above primitive vectors a and b, a vector c representing an entire parallel shift, and integers m and n for identifying each focusing spot. In FIG. 7, it is set to c=0. The primitive vectors a and b and the integers m and n are different depending on a mode of the regular arrangement of the plurality of focusing spots. Examples of the mode of the regular arrangement include a rectangular lattice arrangement, a square lattice arrangement, a triangular lattice arrangement, a kagome lattice arrangement, and a hexagonal lattice arrangement.

Figure 8:
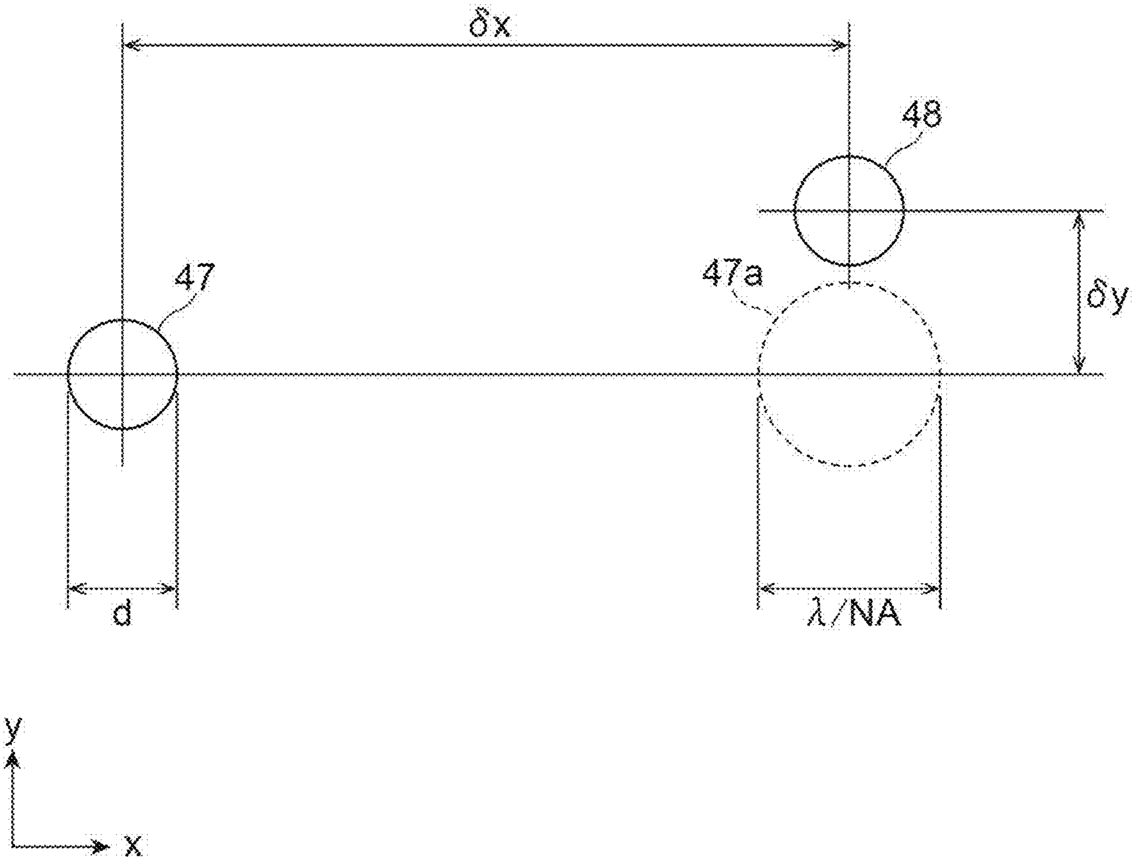
FIG. 8 is a diagram illustrating the arrangement of the plurality of focusing spots on the image plane 46 in more detail.

FIG. 8 is a diagram illustrating the arrangement of the plurality of focusing spots on the image plane 46 in more detail. In this diagram, any two focusing spots 47 and 48 out of the plurality of focusing spots on the image plane 46 are illustrated. Due to discontinuity of light transmission property (transmittance, phase modulation amount) at the boundary between the inner region 43*a* and the outer region 43*b* of the optical mask 43, a side lobe 47*a* which becomes a noise is formed around the focusing spot 47, and in this case, x coordinate values or y coordinate values of respective center positions of the focusing spot 47 and the side lobe 47*a* are equal to each other. When the side lobe 47*a* overlaps with the other focusing spot 48, a position (or a region) of the atom to be trapped by the focusing spot 48 extends to a region of the side lobe 47*a*. As a result, the regular arrangement of the plurality of atoms is not as intended, and the accuracy of the quantum simulation may be reduced.

In order to solve the above problem, in the present embodiment, the light beam generation apparatus 4 forms the plurality of focusing spots on the image plane 46 such that a minimum value $\delta x_{min}$ of a difference between the x coordinate values and a minimum value $\delta y_{min}$ of a difference between the y coordinate values of the center positions of the plurality of focusing spots are longer than a non-overlapping distance.

That is, the coordinate values of the center position of the k1-th focusing spot out of the plurality of (K) focusing spots are set to $(X_{k1}, y_{k1})$, and the coordinate values of the center position of the k2-th focusing spot are set to $(x_{k2}, y_{k2})$, and the difference $\delta x=|x_{k1}-x_{k2}|$ between the x coordinate values and the difference $\delta y=|y_{k1}-y_{k2}|$ between the y coordinate values of the two center positions are acquired. The difference δx between the x coordinate values of the center positions is acquired for the combination of two focusing spots selected from the plurality of focusing spots, and the minimum value $\delta x_{min}$ of the differences is obtained. The minimum value $\delta y_{min}$ is obtained in the same manner. $\delta x_{min}$ represents the minimum value of the distance in the x axis direction between the center position of one focusing spot and the center position of another focusing spot. $\delta y_{min}$ represents the minimum value of the distance in the y axis direction between the center position of the one focusing spot and the center position of the other focusing spot. In addition, the combinations of the two focusing spots selected from the plurality of focusing spots include at least a combination which may affect the trapping of the atoms when the side lobe of the one focusing spot overlaps with the other focusing spot, and may include all the combinations of the two focusing spots.

The non-overlapping distance is a distance between the center positions of the focusing spots which is necessary to prevent the side lobe of the focusing spot from interfering with (affecting) the trapping of the atom by the other focusing spot. Specifically, the non-overlapping distance D can be represented by the following formula of $D=d/2+\lambda/(2NA)$, where d is the size of the atom trapping region by each focusing spot, λ is a wavelength of the light entering the chamber 2 from the light beam generation apparatus 4, and NA is a numerical aperture of the optical system for causing the light to enter the chamber 2 from the light beam generation apparatus 4. A second term on the right side of the above formula represents a radius of the side lobe.

Figure 9:
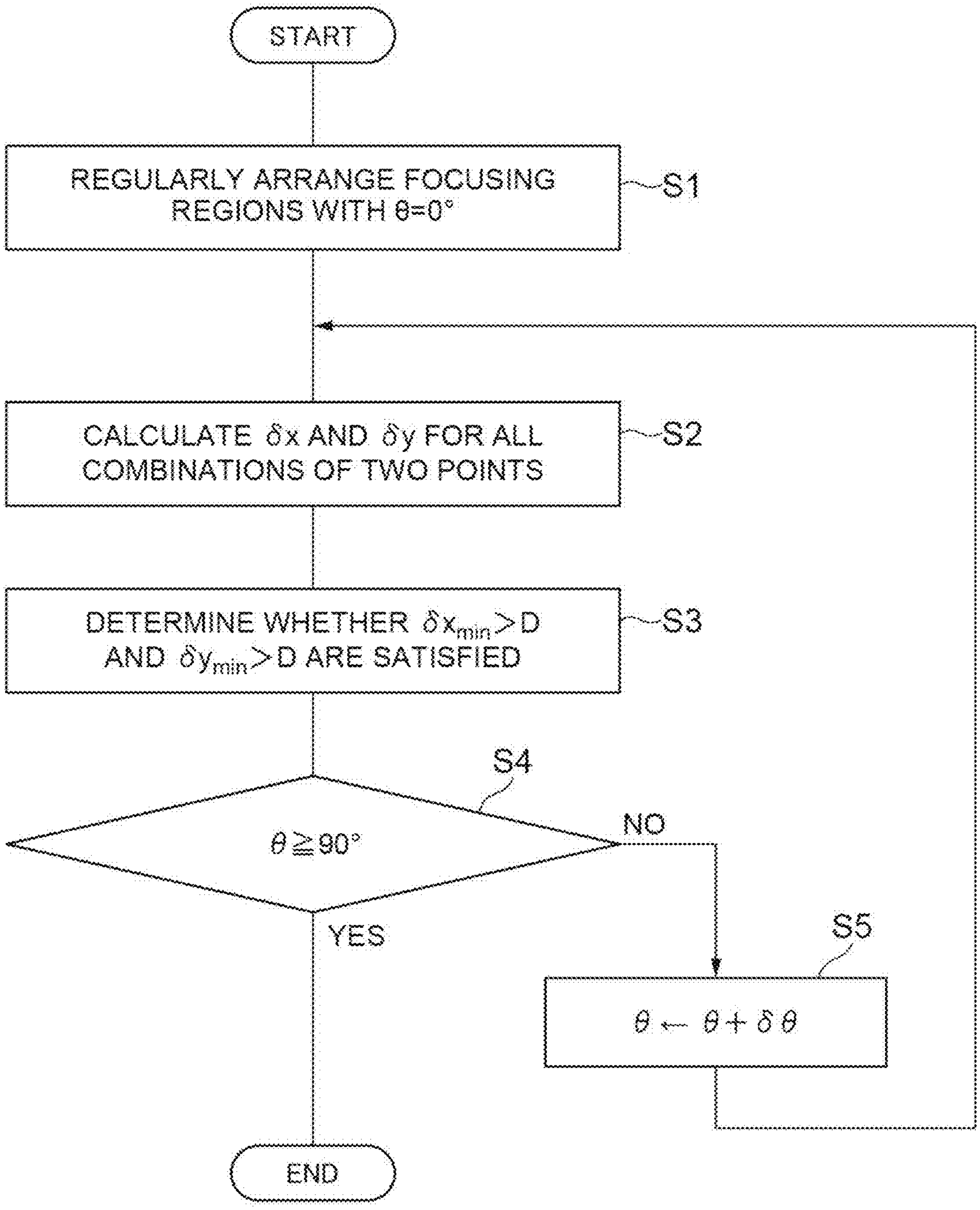
FIG. 9 is a flowchart of processing for obtaining an angle $\theta$ with which a minimum value $\delta x_{min}$ of a difference between x coordinate values and a minimum value $\delta y_{min}$ of a difference between y coordinate values of center positions of the plurality of focusing spots on the image plane 46 can be made longer than a non-overlapping distance D.

FIG. 9 is a flowchart of processing for obtaining the angle θ with which the minimum value $\delta x_{min}$ of the difference between the x coordinate values and the minimum value $\delta y_{min}$ of the difference between the y coordinate values of the center positions of the plurality of focusing spots on the image plane 46 can be made longer than the non-overlapping distance D. In a step S1, the angle θ is set to an initial value of 0°, and the center positions of the plurality of focusing spots are regularly arranged in a lattice pattern of a desired mode. In a step S2, the difference δx between the x coordinate values and the difference δy between the y coordinate values of the center positions are obtained for the combination of the two focusing spots selected from the plurality of focusing spots. In a step S3, it is determined whether or not the minimum value $\delta x_{min}$ of δx is longer than the non-overlapping distance D, and further, it is determined whether or not the minimum value $\delta y_{min}$ of δy is longer than the non-overlapping distance D, and the angle θ in the case where $\delta x_{min}>D$ and $\delta y_{min}>D$ are satisfied is stored. In a step S4, it is determined whether the angle θ is 90° or more. When it is determined in the step S4 that the angle θ is not 90° or more, the angle θ is increased by 80 in a step S5, and the processing from the step S2 is repeatedly performed for the new angle θ. When it is determined in the step S4 that the angle θ is 90° or more, the processing ends.

Next, examples in which the regular arrangement of the plurality of focusing spots is set to a rectangular lattice arrangement, a square lattice arrangement, an equilateral triangular lattice arrangement, a kagome lattice arrangement, and a hexagonal lattice arrangement will be described. FIG. 10 is a table showing the rectangular lattice arrangement, the square lattice arrangement, the equilateral triangular lattice arrangement, the kagome lattice arrangement, and the hexagonal lattice arrangement used in the examples. In this table, for each of the lattice arrangements, the angle formed by the primitive vector a and the primitive vector b, the primitive vector a in the case where θ=0 and θ=α, the primitive vector b in the case where θ=0 and θ=α, and a set of the integers m, n are shown. A length ratio β of the primitive vectors a and b is set to 1.2 in the rectangular lattice arrangement of the first example, and is set to 1 in the square lattice arrangement of the second example. L in the table is a minimum interval of the center positions of the focusing spots.

In the first example, the regular arrangement of the plurality of focusing spots is set to the rectangular lattice arrangement. In the second example, the regular arrangement of the plurality of focusing spots is set to the square lattice arrangement. In the third example, the regular arrangement of the plurality of focusing spots is set to the equilateral triangular lattice arrangement. In the fourth example, the regular arrangement of the plurality of focusing spots is set to the kagome lattice arrangement. In the fifth example, the regular arrangement of the plurality of focusing spots is set to the hexagonal lattice arrangement. In the first to fifth examples, the size d of the atom trapping region by the focusing spot is set to 0.2 μm, the minimum interval L of the center positions of the focusing spots is set to 10 μm, the wavelength λ of the light incident from the light beam generation apparatus 4 into the chamber 2 is set to 0.9 μm, the numerical aperture NA of the optical system for causing the light to be incident from the light beam generation apparatus 4 into the chamber 2 is set to 0.5, and the non-overlapping distance D is set to 1.0 μm.

Figure 11:
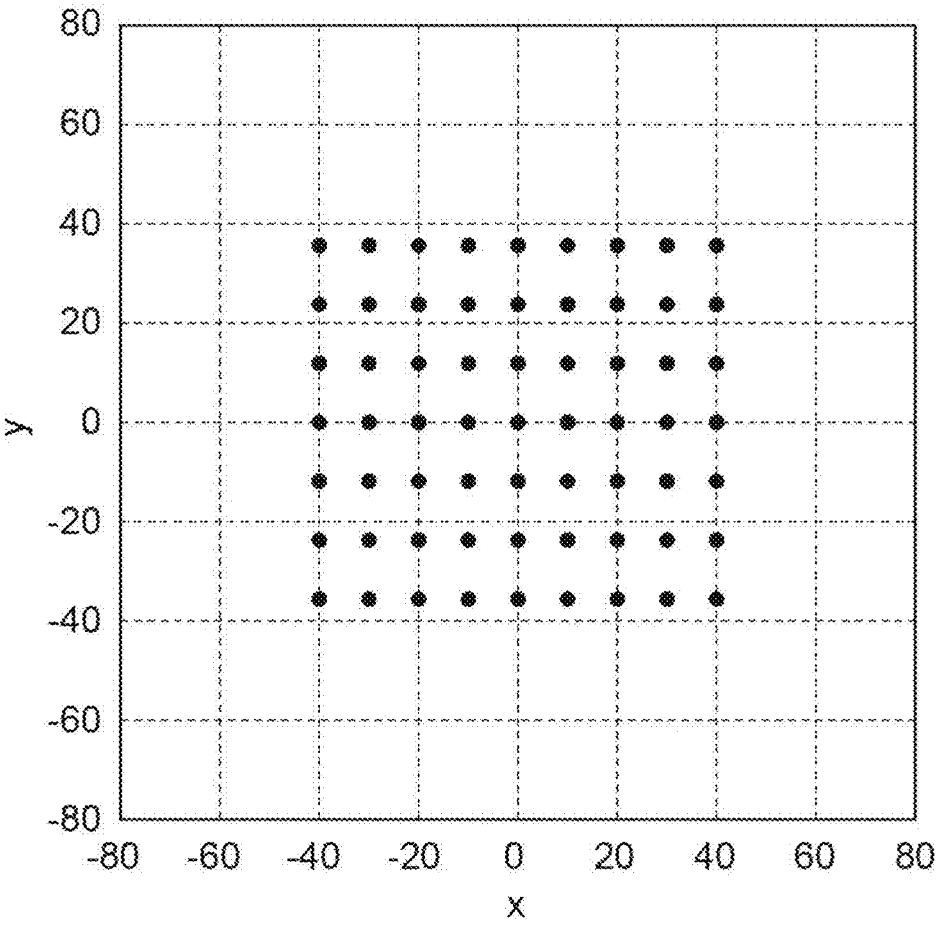
FIG. 11 is a diagram showing the rectangular lattice arrangement of the plurality of focusing spots when $\theta=0°$ in a first example.
Figure 12:
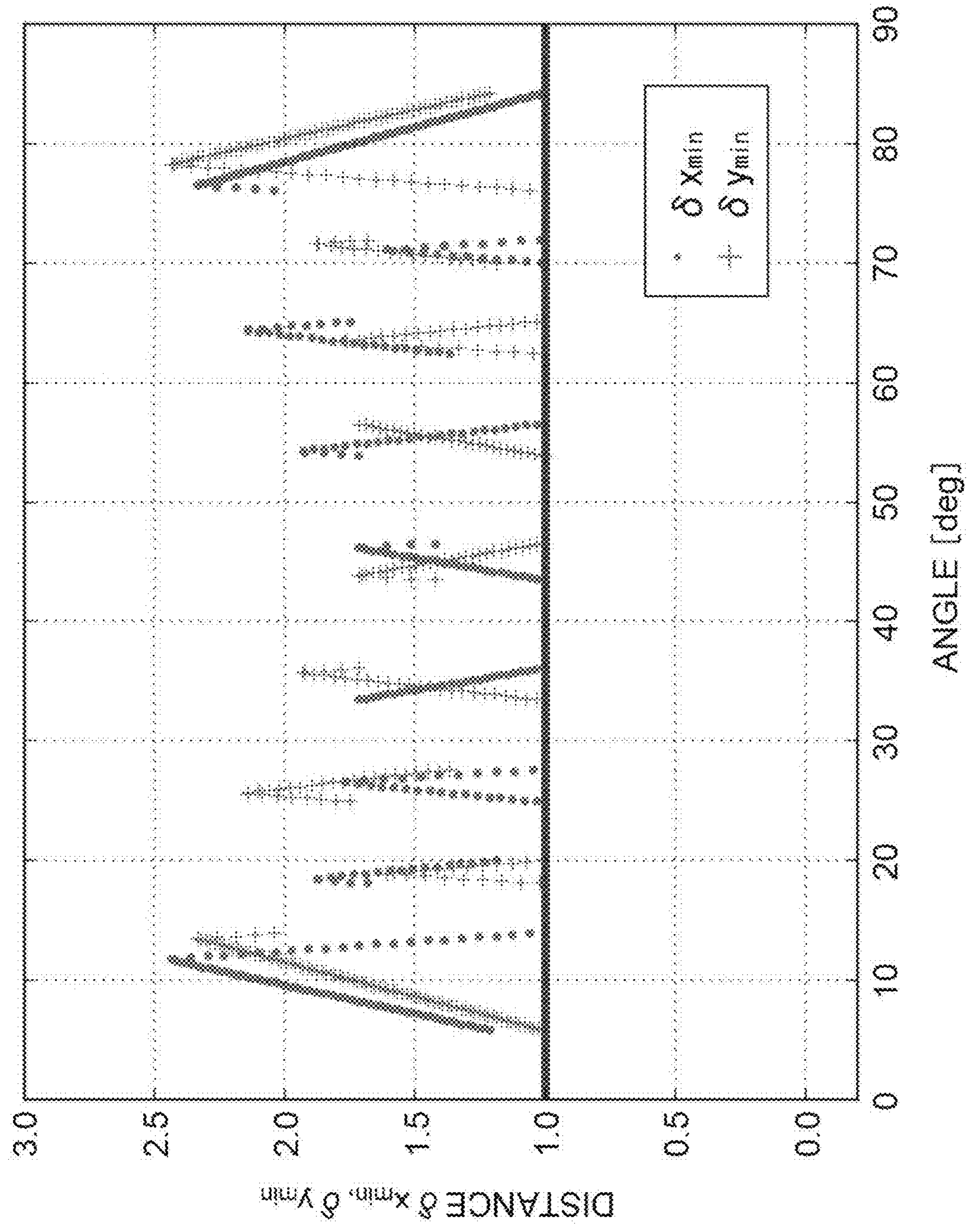
FIG. 12 is a diagram showing a value of $\delta x_{min}$ and a value of $\delta y_{min}$ in a range of the angle $\theta$ satisfying $\delta x_{min}>D$ and $\delta y_{min}>D$ in the first example.

FIG. 11 is a diagram showing the rectangular lattice arrangement of the plurality of focusing spots when θ=0° in the first example. FIG. 12 is a diagram showing the value of $\delta x_{min}$ and the value of $\delta y_{min}$ in the range of the angle θ satisfying $\delta x_{min}>D$ and $\delta y_{min}>D$ in the first example.

Figure 13:
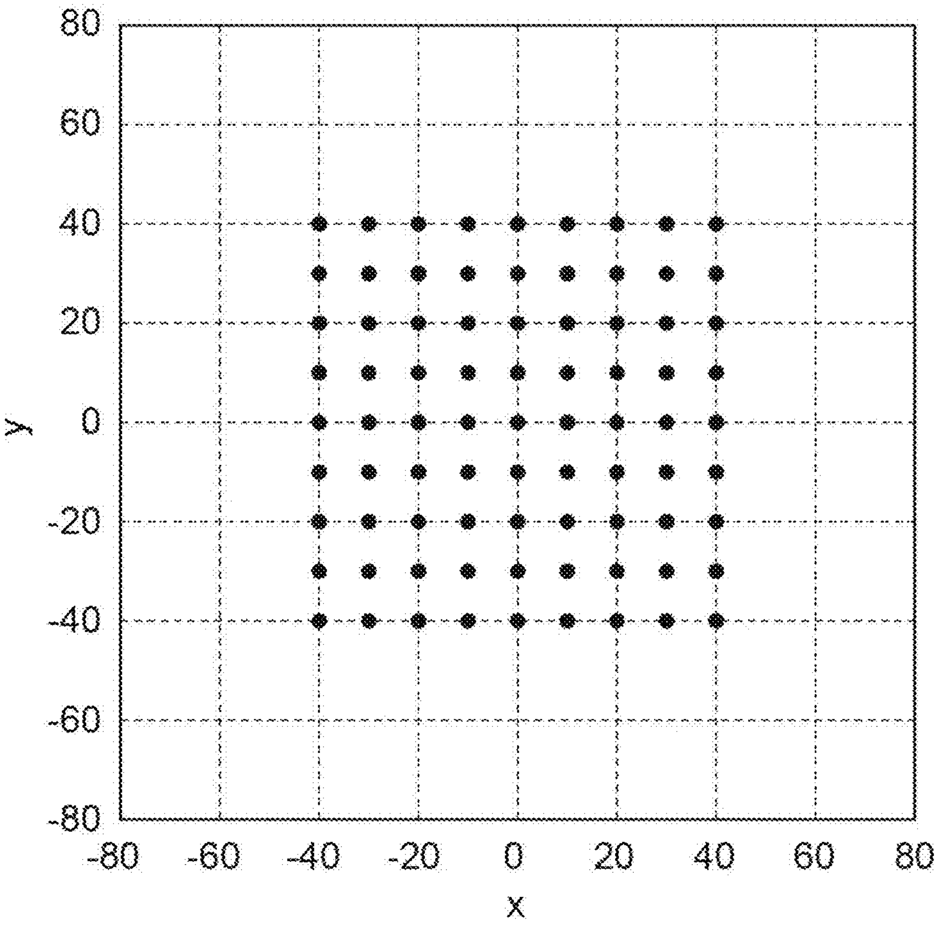
FIG. 13 is a diagram showing the square lattice arrangement of the plurality of focusing spots when $\theta=0°$ in a second example.
Figure 14:
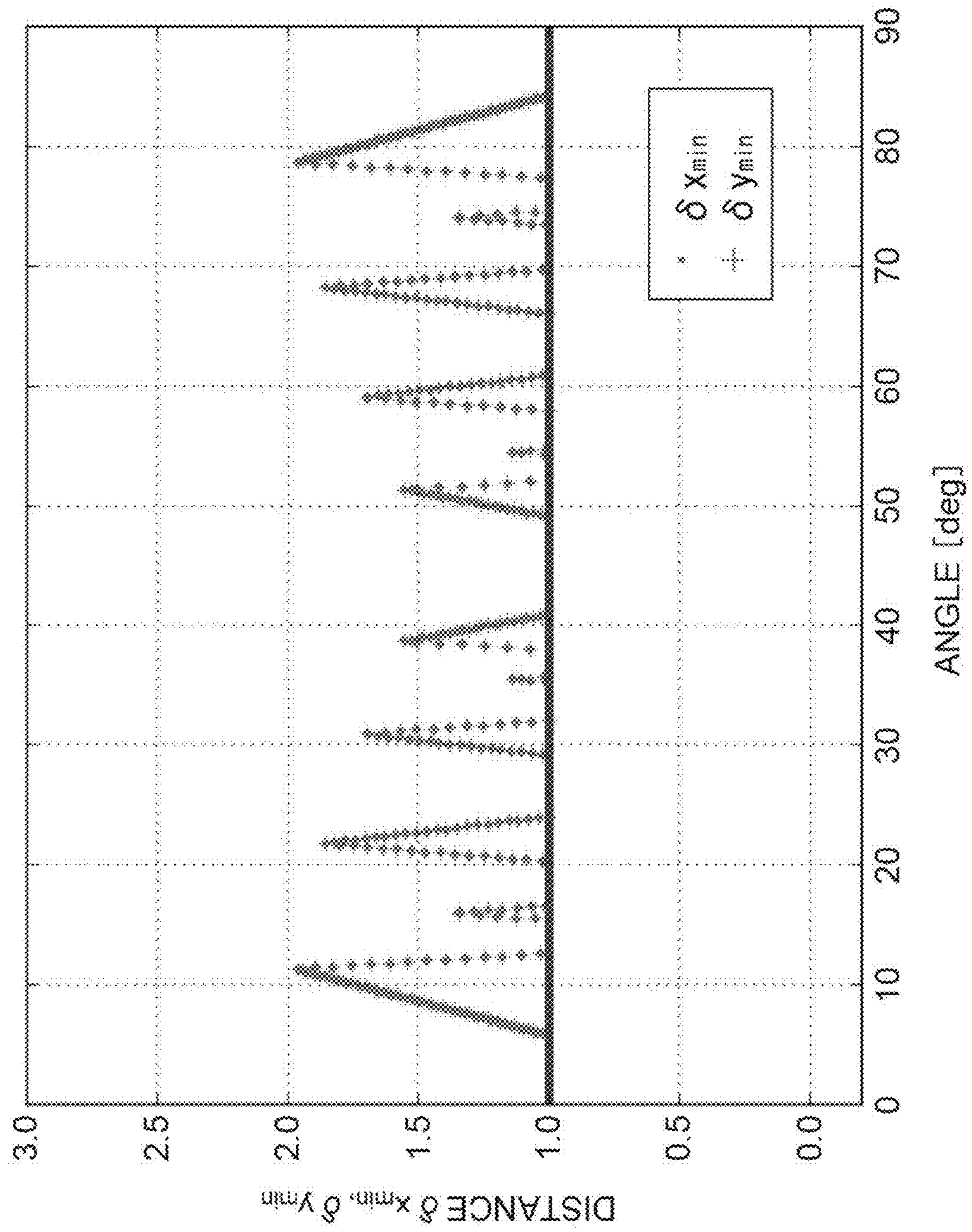
FIG. 14 is a diagram showing a value of $\delta x_{min}$ and a value of $\delta y_{min}$ in a range of the angle $\theta$ satisfying $\delta x_{min}>D$ and $\delta y_{min}>D$ in the second example.

FIG. 13 is a diagram showing the square lattice arrangement of the plurality of focusing spots when θ=0° in the second example. FIG. 14 is a diagram showing the value of $\delta x_{min}$ and the value of $\delta y_{min}$ in the range of the angle θ satisfying $\delta x_{min}>D$ and $\delta y_{min}>D$ in the second example.

Figure 15:
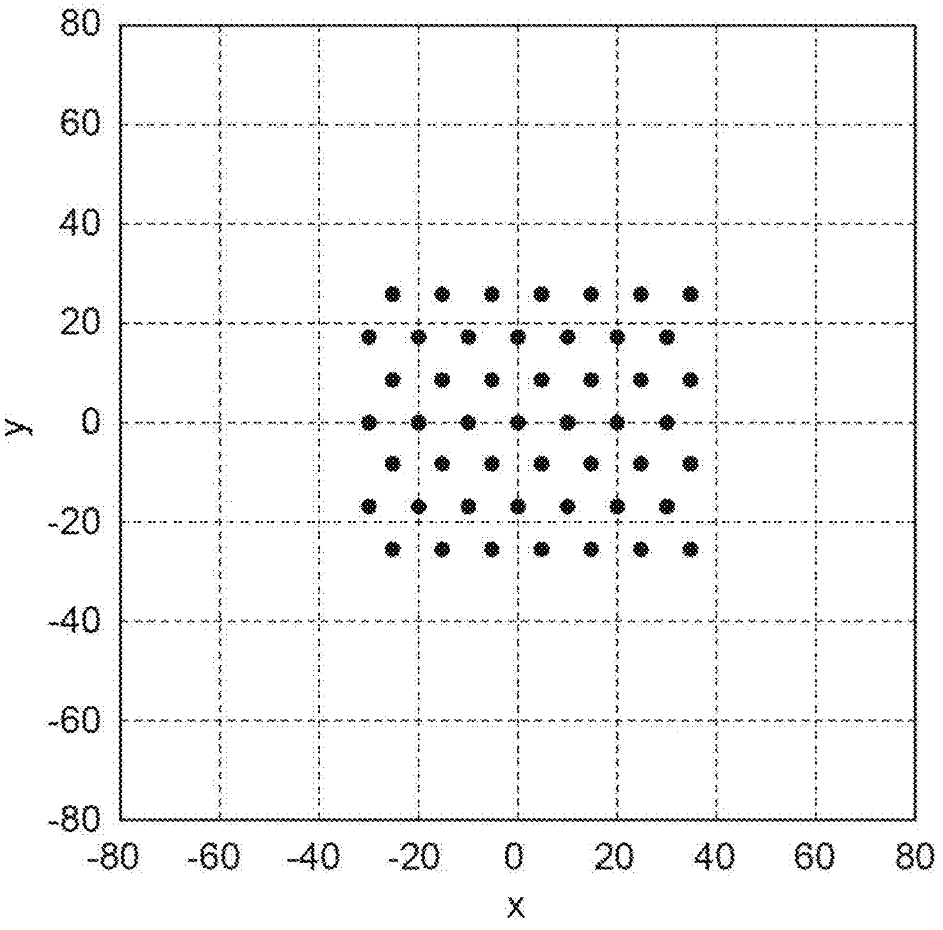
FIG. 15 is a diagram showing the equilateral triangular lattice arrangement of the plurality of focusing spots when $\theta=0°$ in a third example.
Figure 16:
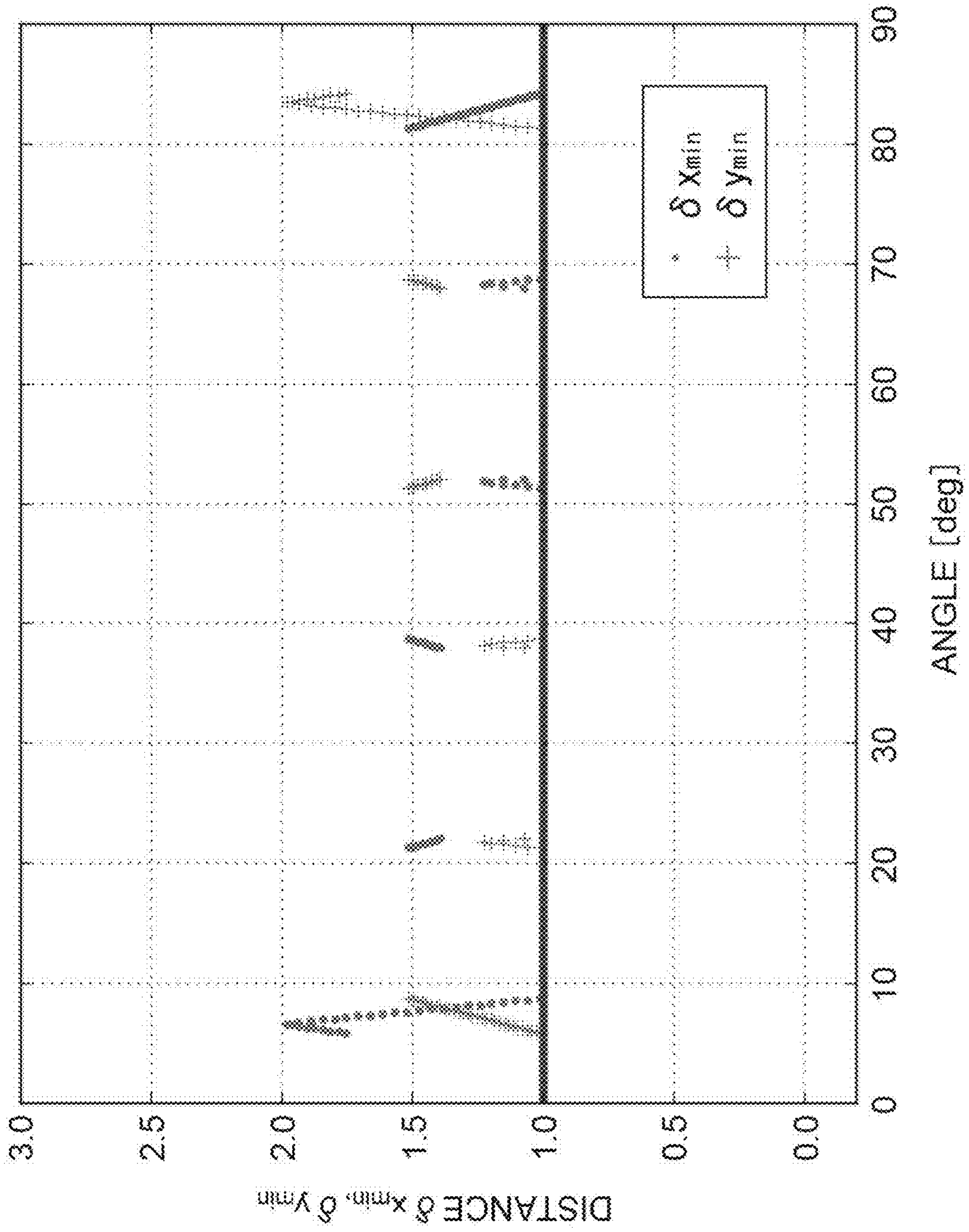
FIG. 16 is a diagram showing a value of $\delta x_{min}$ and a value of $\delta y_{min}$ in a range of the angle $\theta$ satisfying $\delta x_{min}>D$ and $\delta y_{min}>D$ in the third example.

FIG. 15 is a diagram showing the equilateral triangular lattice arrangement of the plurality of focusing spots when θ=0° in the third example. FIG. 16 is a diagram showing the value of $\delta x_{min}$ and the value of $\delta y_{min}$ in the range of the angle θ satisfying $\delta x_{min}>D$ and $\delta y_{min}>D$ in the third example.

Figure 17:
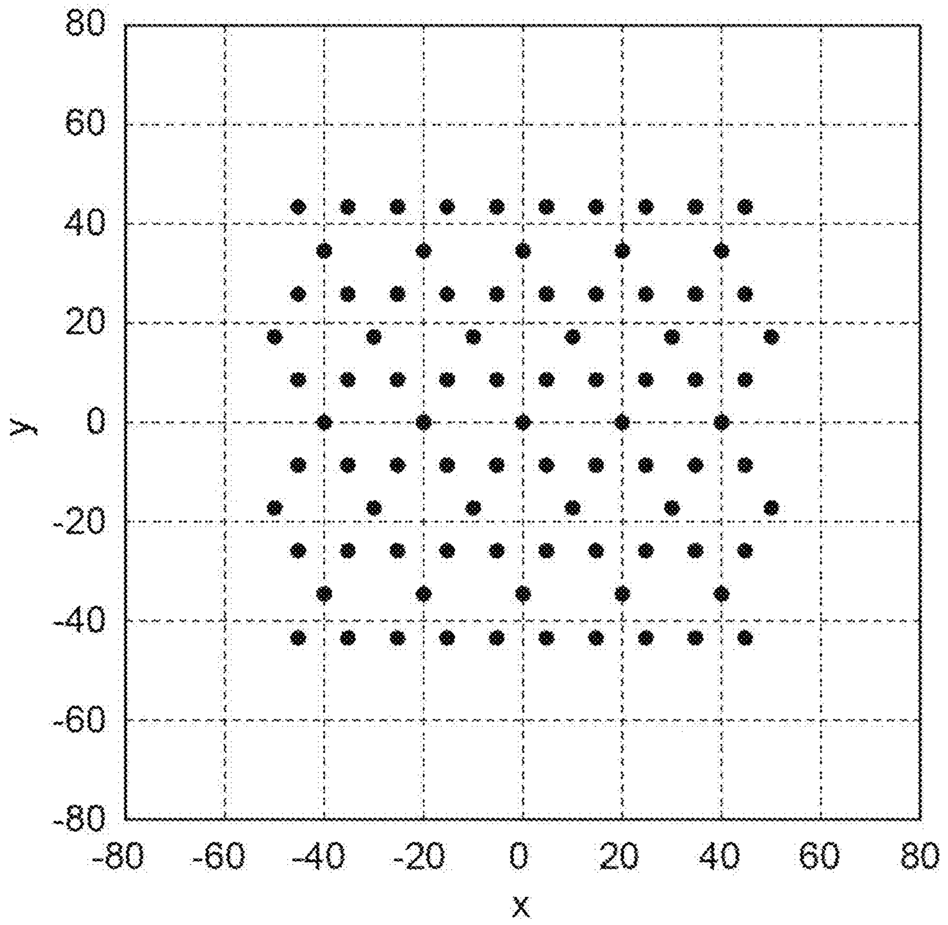
FIG. 17 is a diagram showing the kagome lattice arrangement of the plurality of focusing spots when $\theta=0°$ in a fourth example.
Figure 18:
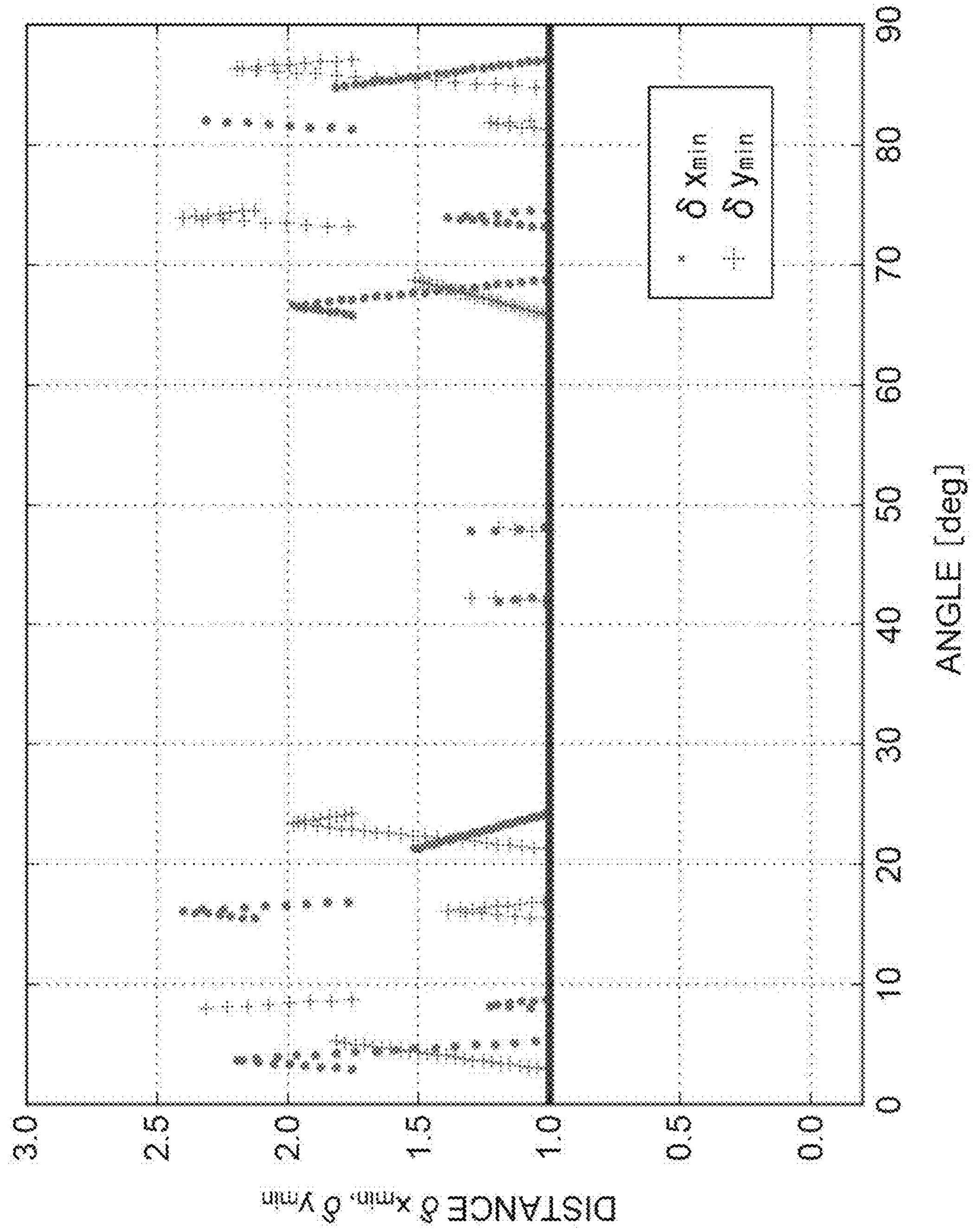
FIG. 18 is a diagram showing a value of $\delta x_{min}$ and a value of $\delta y_{min}$ in a range of the angle $\theta$ satisfying $\delta x_{min}>D$ and $\delta y_{min}>D$ in the fourth example.

FIG. 17 is a diagram showing the kagome lattice arrangement of the plurality of focusing spots when θ=0° in the fourth example. FIG. 18 is a diagram showing the value of $\delta x_{min}$ and the value of $\delta y_{min}$ in the range of the angle θ satisfying $\delta x_{min}>D$ and $\delta y_{min}>D$ in the fourth example.

Figure 19:
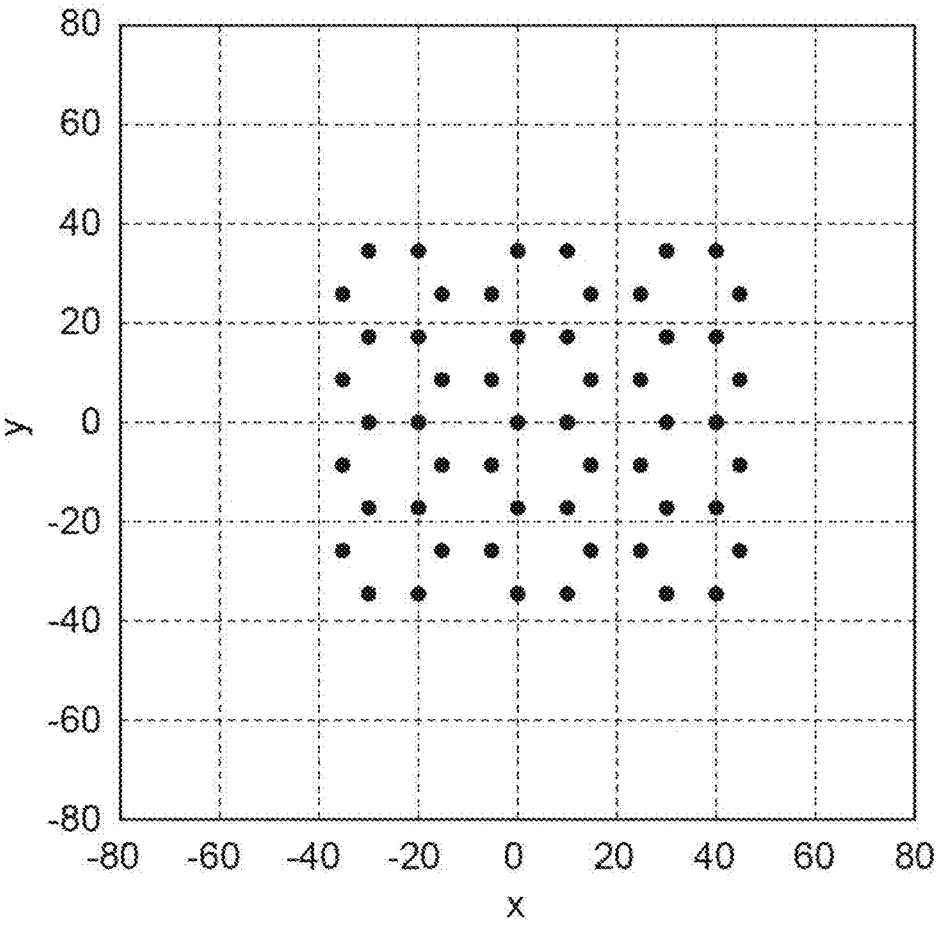
FIG. 19 is a diagram showing the hexagonal lattice arrangement of the plurality of focusing spots when $\theta=0°$ in a fifth example.
Figure 20:
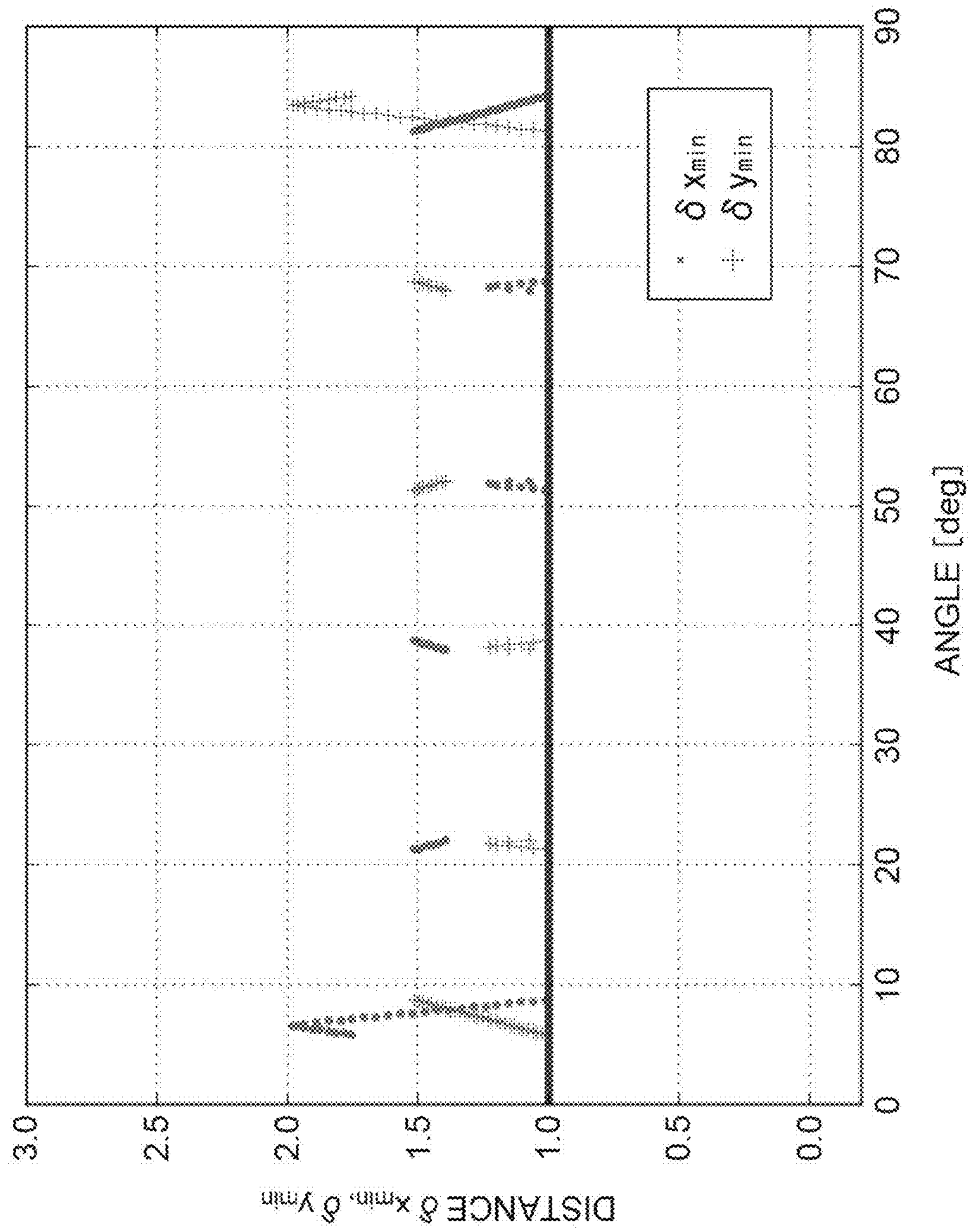
FIG. 20 is a diagram showing a value of $\delta x_{min}$ and a value of $\delta y_{min}$ in a range of the angle $\theta$ satisfying $\delta x_{min}>D$ and $\delta y_{min}>D$ in the fifth example.

FIG. 19 is a diagram showing the hexagonal lattice arrangement of the plurality of focusing spots when θ=0° in the fifth example. FIG. 20 is a diagram showing the value of $\delta x_{min}$ and the value of $\delta y_{min}$ in the range of the angle θ satisfying $\delta x_{min}>D$ and $\delta y_{min}>D$ in the fifth example.

In each of FIG. 11, FIG. 13, FIG. 15, FIG. 17, and FIG. 19, circular points in the diagram indicate the focusing spots on the image plane. In each of FIG. 12, FIG. 14, FIG. 16, FIG. 18, and FIG. 20, the horizontal axis indicates the angle θ, the vertical axis indicates $\delta x_{min}$ and $\delta y_{min}$, the value of $\delta x_{min}$ is indicated by a circular point, and the value of $\delta y_{min}$ is indicated by a +point.

As can be seen from these diagrams, in any of the first to fifth examples, a plurality of ranges of the angle θ satisfying $\delta x_{min}>D$ and $\delta y_{min}>D$ exist discontinuously in the range of θ=0° to 90°, and exist symmetrically with θ=45° as the center. Even when the accuracy of setting the angle θ is low, the range of the angle θ which continuously satisfies $\delta x_{min}>D$ and $\delta y_{min}>D$ is wide, and when the angle θ is set near the center angle in this range, $\delta x_{min}>D$ and $\delta y_{min}>D$ can be reliably satisfied. For example, in the first example (rectangular lattice arrangement) shown in FIG. 11 and FIG. 12, $\delta x_{min}>D$ and $\delta y_{min}>D$ are continuously satisfied in the angle range of approximately θ=6° to 14°, and thus, it is preferable to set at a point near θ=10°, which is the center angle in this range.

Figure 21:
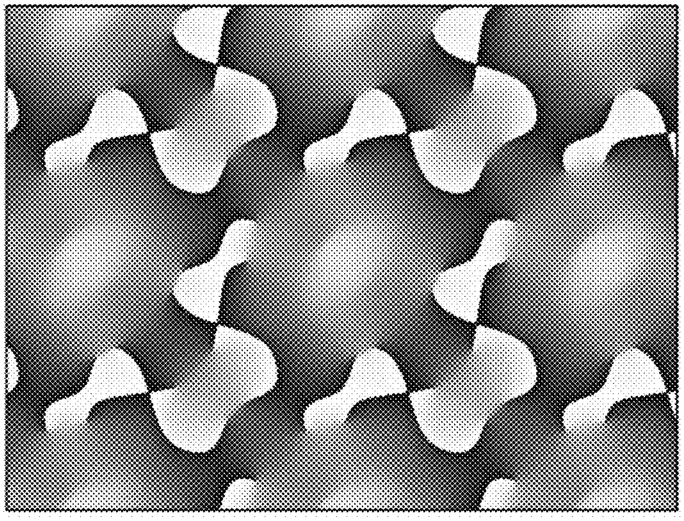
FIG. 21 is a diagram showing an example of a phase modulation distribution presented on the spatial light modulator 44 when the plurality of focusing spots are arranged in the square lattice arrangement ($\theta=0°$) on the image plane 46 in the configuration of the light beam generation apparatus 4A illustrated in FIG. 3.
Figure 22:
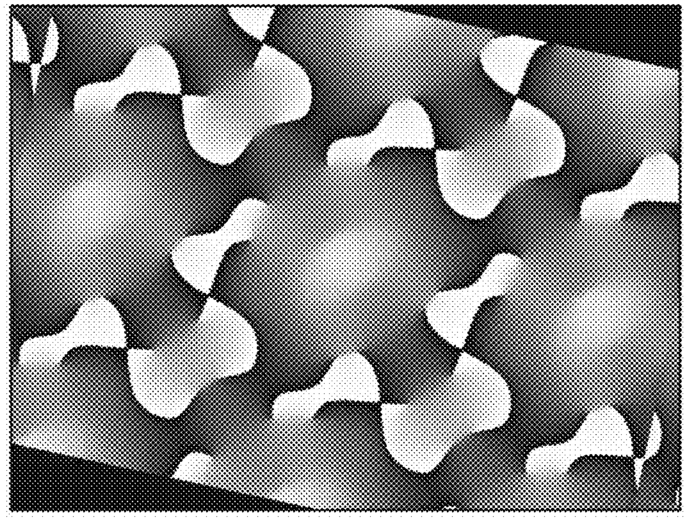
FIG. 22 is a diagram showing an example of a phase modulation distribution presented on the spatial light modulator 44 when the plurality of focusing spots are arranged in the square lattice arrangement ($\theta=12°$) on the image plane 46 in the configuration of the light beam generation apparatus 4A illustrated in FIG. 3.
Figure 23:
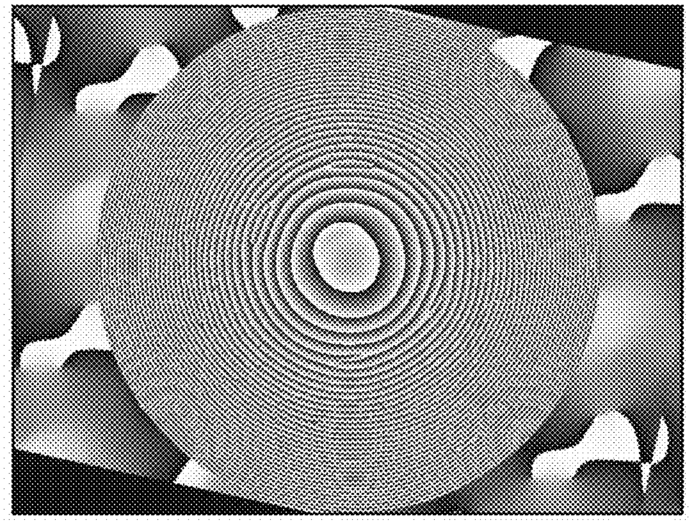
FIG. 23 is a diagram showing an example of a phase modulation distribution presented on the spatial light modulator 44 when the plurality of focusing spots are arranged in the square lattice arrangement ($\theta=12°$) on the image plane 46 in the configuration of the light beam generation apparatus 4B illustrated in FIG. 4.

FIG. 21 is a diagram showing an example of the phase modulation distribution presented on the spatial light modulator 44 when the plurality of focusing spots are arranged in the square lattice arrangement (θ=0°) on the image plane 46 in the configuration of the light beam generation apparatus 4A illustrated in FIG. 3. FIG. 22 is a diagram showing an example of the phase modulation distribution presented on the spatial light modulator 44 when the plurality of focusing spots are arranged in the square lattice arrangement (θ=12°) on the image plane 46 in the configuration of the light beam generation apparatus 4A illustrated in FIG. 3. FIG. 23 is a diagram showing an example of the phase modulation distribution presented on the spatial light modulator 44 when the plurality of focusing spots are arranged in the square lattice arrangement (θ=12°) on the image plane 46 in the configuration of the light beam generation apparatus 4B illustrated in FIG. 4. The modulation distribution of FIG. 23 is obtained by adding the modulation distribution (Fresnel lens pattern) for realizing the lens function to the modulation distribution of FIG. 22. In these diagrams, a magnitude of the phase modulation in each pixel on the modulation plane of the spatial light modulator 44 is indicated by light and shade. In any case, the plurality of focusing spots can be arranged in the square lattice arrangement on the image plane 46.

As described above, in the present embodiment, when forming the plurality of focusing spots on the image plane 46, the light beam generation apparatus 4 causes the minimum value $\delta x_{min}$ of the difference between the x coordinate values and the minimum value $\delta y_{min}$ of the difference between the y coordinate values of the center positions of the plurality of focusing spots to be longer than the non-overlapping distance D. As a result, the side lobe of a certain focusing spot can be prevented from interfering with (affecting) the trapping of the atom by another focusing spot, and thus, the regular arrangement of the plurality of atoms can be performed with high accuracy, and the accuracy of quantum simulation can be improved.

In addition, on the image plane 46, it is important not only to prevent the side lobe due to the discontinuity of the light transmission property at the boundary between the inner region 43*a* and the outer region 43*b* of the optical mask 43 from overlapping with the focusing spot, but also to prevent the side lobe due to the shape of each pixel of the spatial light modulator 44 from overlapping with the focusing spot.

In the case where the s axis direction and the t axis direction on the optical mask 43 are parallel to the u axis direction and the v axis direction on the modulation plane of the spatial light modulator 44, when the side lobe due to the discontinuity of the light transmission property at the boundary between the inner region 43*a* and the outer region 43*b* of the optical mask 43 does not overlap with the focusing spot as described above, the side lobe due to the shape of each pixel of the spatial light modulator 44 does not overlap with the focusing spot.

In the case where the s axis direction and the t axis direction on the optical mask 43 are not parallel to the u axis direction and the v axis direction on the modulation plane of the spatial light modulator 44, a range of the angle θ for preventing the side lobe due to the discontinuity of the light transmission property at the boundary between the inner region 43*a* and the outer region 43*b* of the optical mask 43 from overlapping with the focusing spot may be obtained as described above, and further, a range of the angle θ for preventing the side lobe due to the shape of each pixel of the spatial light modulator 44 from overlapping with the focusing spot may be obtained in a similar way, and the angle θ included in both of these two ranges may be adopted.

The quantum simulator and the quantum simulation method are not limited to the embodiments and configuration examples described above, and can be modified in various manners.

The quantum simulator of the above embodiment includes (1) a chamber having a window; (2) a light beam generation apparatus for causing light to enter the chamber through the window, and forming and regularly arranging a plurality of focusing spots for trapping atoms one-dimensionally or two-dimensionally on an image plane in the chamber; and (3) a detector for detecting a state of the atoms trapped in the focusing spots in the chamber. The light beam generation apparatus includes an optical mask including an inner region having a rectangular shape with a side parallel to a first direction or a second direction and an outer region surrounding the inner region, and having a light transmittance or a phase modulation amount being different between the inner region and the outer region, and a spatial light modulator for spatially phase-modulating or amplitude-modulating light input to a modulation plane on which a plurality of pixels are arranged two-dimensionally and outputting modulated light, and causes the modulated light modulated by the spatial light modulator via the optical mask to enter the chamber through the window, and when an xy coordinate system including an x axis parallel to the first direction and a y axis parallel to the second direction is set on the image plane, the plurality of focusing spots are formed such that a minimum value $\delta x_{min}$ of a difference between x coordinate values and a minimum value $\delta y_{min}$ of a difference between y coordinate values of center positions of the plurality of focusing spots are longer than a non-overlapping distance.

In one aspect of the above embodiment, when a size of an atom trapping region by each of the plurality of focusing spots is set to d, a wavelength of the light entering the chamber is set to 2, and a numerical aperture of an optical system for causing the light to enter the chamber is set to NA, the light beam generation apparatus may form the plurality of focusing spots such that $\delta x_{min}$ and $\delta y_{min}$ are longer than the non-overlapping distance obtained by a formula of $d/2+\lambda/(2NA)$. The light beam generation apparatus may set the size d of the atom trapping region by each of the plurality of focusing spots based on a thermal vibration amplitude of the atoms to be trapped. Further, the light beam generation apparatus may form and regularly arrange the plurality of focusing spots on the image plane in a rectangular lattice shape, a square lattice shape, a triangular lattice shape, a kagome lattice shape, or a hexagonal lattice shape.

In one aspect of the above embodiment, the quantum simulator may further include an optical stimulation application apparatus for applying a stimulus to the atoms in the chamber by light entering the chamber through the window, and further, may further include an atomic gas supply apparatus for supplying an atomic gas into the chamber.

In one aspect of the above embodiment, in the light beam generation apparatus, a plurality of pixels each having a rectangular shape with a side parallel to a third direction or a fourth direction may be arranged two-dimensionally on the modulation plane of the spatial light modulator, and when an xy coordinate system including an x axis parallel to the third direction and a y axis parallel to the fourth direction is set on the image plane, the plurality of focusing spots may be formed such that a minimum value $\delta x_{min}$ of a difference between x coordinate values and a minimum value $\delta y_{min}$ of a difference between y coordinate values of the center positions of the plurality of focusing spots are longer than the non-overlapping distance.

The quantum simulation method of the above embodiment includes (1) an optical trapping step of causing light to enter a chamber through a window of the chamber, and forming and regularly arranging a plurality of focusing spots for trapping atoms one-dimensionally or two-dimensionally on an image plane in the chamber; and (2) a detection step of detecting a state of the atoms trapped in the focusing spots in the chamber. In the optical trapping step, an optical mask including an inner region having a rectangular shape with a side parallel to a first direction or a second direction and an outer region surrounding the inner region, and having a light transmittance or a phase modulation amount being different between the inner region and the outer region, and a spatial light modulator for spatially phase-modulating or amplitude-modulating light input to a modulation plane on which a plurality of pixels are arranged two-dimensionally and outputting modulated light are used, and the modulated light modulated by the spatial light modulator via the optical mask is caused to enter the chamber through the window, and when an xy coordinate system including an x axis parallel to the first direction and a y axis parallel to the second direction is set on the image plane, the plurality of focusing spots are formed such that a minimum value $\delta x_{min}$ of a difference between x coordinate values and a minimum value $\delta y_{min}$ of a difference between y coordinate values of center positions of the plurality of focusing spots are longer than a non-overlapping distance.

In one aspect of the above embodiment, in the optical trapping step, when a size of an atom trapping region by each of the plurality of focusing spots is set to d, a wavelength of the light entering the chamber is set to λ, and a numerical aperture of an optical system for causing the light to enter the chamber is set to NA, the plurality of focusing spots may be formed such that $\delta x_{min}$ and $\delta y_{min}$ are longer than the non-overlapping distance obtained by a formula of d/2+λ/(2NA). In the optical trapping step, the size d of the atom trapping region by each of the plurality of focusing spots may be set based on a thermal vibration amplitude of the atoms to be trapped. Further, in the optical trapping step, the plurality of focusing spots may be formed and regularly arranged on the image plane in a rectangular lattice shape, a square lattice shape, a triangular lattice shape, a kagome lattice shape, or a hexagonal lattice shape.

In one aspect of the above embodiment, the quantum simulation method may further include an optical stimulation application step of applying a stimulus to the atoms in the chamber by light entering the chamber through the window, and further, may further include an atomic gas supply step of supplying an atomic gas into the chamber.

In one aspect of the above embodiment, in the optical trapping step, a plurality of pixels each having a rectangular shape with a side parallel to a third direction or a fourth direction may be arranged two-dimensionally on the modulation plane of the spatial light modulator, and when an xy coordinate system including an x axis parallel to the third direction and a y axis parallel to the fourth direction is set on the image plane, the plurality of focusing spots may be formed such that a minimum value $\delta x_{min}$ of a difference between x coordinate values and a minimum value $\delta y_{min}$ of a difference between y coordinate values of the center positions of the plurality of focusing spots are longer than the non-overlapping distance.

INDUSTRIAL APPLICABILITY

The present invention can be used as a quantum simulator and a quantum simulation method capable of performing regular arrangement of a plurality of atoms with high accuracy.

REFERENCE SIGNS LIST

- 1—optical stimulation application apparatus, 10—control unit, 11—light source, 12—beam expander, 15—spatial light modulator, 16—lens.
- 2—chamber, 21—first window (window), 22—second window (window), 23—exhaust opening, 24—atomic gas introduction opening.
- 3—atomic gas supply apparatus.
- 4, 4A, 4B—light beam generation apparatus, 41—light source, 42—beam expander, 43—optical mask, 44—spatial light modulator, 45—lens, 46—image plane.
- 5—photodetector, 51—dichroic mirror.
- 6—atom number detector, 61—ionization electrode, 62—ion detector.
- 100—quantum simulator.

The invention claimed is:

1. A quantum simulator comprising:

a chamber having a window;

a light beam generator configured to cause light to enter the chamber through the window, and form and regularly arrange a plurality of focusing spots for trapping atoms one-dimensionally or two-dimensionally on an image plane in the chamber; and a detector configured to detect a state of the atoms trapped in the focusing spots in the chamber, wherein the light beam generator includes an optical mask including an inner region having a rectangular shape with a side parallel to a first direction or a second direction and an outer region surrounding the inner region, and having a light transmittance or a phase modulation amount being different between the inner region and the outer region, and a spatial light modulator configured to spatially phase-modulate or amplitude-modulate light input to a modulation plane on which a plurality of pixels are arranged two-dimensionally and output modulated light, and is configured to cause the modulated light modulated by the spatial light modulator via the optical mask to enter the chamber through the window, and when an xy coordinate system including an x axis parallel to the first direction and a y axis parallel to the second direction is set on the image plane, the plurality of focusing spots are formed such that a minimum value $\delta x_{min}$ of a difference between x coordinate values and a minimum value $\delta y_{min}$ of a difference between y coordinate values of center positions of the plurality of focusing spots are longer than a non-overlapping distance D represented by the formula of D=d/2+λ/(2NA), wherein the non-overlapping distance is a distance between the center positions of the plurality of focusing spots, which prevents a side lobe of a focusing spot of the plurality of focusing spots from interfering with trapping of an atom by another focusing spot of the plurality of focusing spots, and when a diameter of an atom trapping region by each of the plurality of focusing spots is set to d, a wavelength of the light entering the chamber is set to λ, and a numerical aperture of at least one lens that causes the light to enter the chamber is set to NA, the light beam generator is configured to form the plurality of focusing spots such that $\delta x_{min}$ and $\delta y_{min}$ are longer than the non-overlapping distance D obtained by the formula of d/2+λ/(2NA).

2. The quantum simulator according to claim 1, wherein the light beam generator is configured to set the size d of the atom trapping region by each of the plurality of focusing spots based on a thermal vibration amplitude of the atoms to be trapped.

3. The quantum simulator according to claim 1, wherein the light beam generator is configured to form and regularly arrange the plurality of focusing spots on the image plane in a rectangular lattice shape, a square lattice shape, a triangular lattice shape, a kagome lattice shape, or a hexagonal lattice shape.

4. The quantum simulator according to claim 1, further comprising at least one spatial light modulator configured to apply a stimulus to the atoms in the chamber by light entering the chamber through the window.

5. The quantum simulator according to claim 1, further comprising an atomic gas supply apparatus configured to supply an atomic gas into the chamber.

6. The quantum simulator according to claim 1, wherein in the light beam generator, the plurality of pixels each having a rectangular shape with a side parallel to a third direction or a fourth direction are arranged two-dimensionally on the modulation plane of the spatial light modulator, and when another xy coordinate system including a second x axis parallel to the third direction and a second y axis parallel to the fourth direction is set on the image plane, the plurality of focusing spots are formed such that a minimum value $\delta x_{min}$ of a difference between x coordinate values and a minimum value $\delta y_{min}$ of a difference between y coordinate values of the center positions of the plurality of focusing spots are longer than the non-overlapping distance.

7. A quantum simulation method comprising:

performing an optical trapping of causing light to enter a chamber through a window of the chamber, and forming and regularly arranging a plurality of focusing spots for trapping atoms one-dimensionally or two-dimensionally on an image plane in the chamber; and performing a detection of detecting a state of the atoms trapped in the focusing spots in the chamber, wherein in the optical trapping, an optical mask including an inner region having a rectangular shape with a side parallel to a first direction or a second direction and an outer region surrounding the inner region, and having a light transmittance or a phase modulation amount being different between the inner region and the outer region, and a spatial light modulator configured to spatially phase-modulate or amplitude-modulate light input to a modulation plane on which a plurality of pixels are arranged two-dimensionally and output modulated light are used, and the modulated light modulated by the spatial light modulator via the optical mask is caused to enter the chamber through the window, and when an xy coordinate system including an x axis parallel to the first direction and a y axis parallel to the second direction is set on the image plane, the plurality of focusing spots are formed such that a minimum value $\delta x_{min}$ of a difference between x coordinate values and a minimum value $\delta y_{min}$ of a difference between y coordinate values of center positions of the plurality of focusing spots are longer than a non-overlapping distance D represented by the formula of $D=d/2+\lambda/(2NA)$, wherein the non-overlapping distance is a distance between the center positions of the plurality of focusing spots, which prevents a side lobe of a focusing spot of the plurality of focusing spots from interfering with trapping of an atom by another focusing spot of the plurality of focusing spots, and when a diameter of an atom trapping region by each of the plurality of focusing spots is set to d, a wavelength of the light entering the chamber is set to λ, and a numerical aperture of at least one lens that causes the light to enter the chamber is set to NA, the light beam generator is configured to form the plurality of focusing spots such that $\delta x_{min}$ and $\delta y_{min}$ are longer than the non-overlapping distance D obtained by the formula of $d/2+\lambda(2NA)$.

8. The quantum simulation method according to claim 7, wherein in the optical trapping, the size d of the atom trapping region by each of the plurality of focusing spots is set based on a thermal vibration amplitude of the atoms to be trapped.

9. The quantum simulation method according to claim 7, wherein in the optical trapping, the plurality of focusing spots are formed and regularly arranged on the image plane in a rectangular lattice shape, a square lattice shape, a triangular lattice shape, a kagome lattice shape, or a hexagonal lattice shape.

10. The quantum simulation method according to claim 7, further comprising applying a stimulus to the atoms in the chamber by light entering the chamber through the window.

11. The quantum simulation method according to claim 7, further comprising performing an atomic gas supply of supplying an atomic gas into the chamber.

12. The quantum simulation method according to claim 7, wherein in the optical trapping, the plurality of pixels each having a rectangular shape with a side parallel to a third direction or a fourth direction are arranged two-dimensionally on the modulation plane of the spatial light modulator, and when another xy coordinate system including a second x axis parallel to the third direction and a second y axis parallel to the fourth direction is set on the image plane, the plurality of focusing spots are formed such that a minimum value $\delta x_{min}$ of a difference between x coordinate values and a minimum value $\delta y_{min}$ of a difference between y coordinate values of the center positions of the plurality of focusing spots are longer than the non-overlapping distance.

* * * * *